(12) United States Patent
Matsumura et al.

(10) Patent No.: US 8,320,051 B2
(45) Date of Patent: Nov. 27, 2012

(54) ZOOM LENS SYSTEM, IMAGING DEVICE AND CAMERA

(75) Inventors: Yoshio Matsumura, Osaka (JP); Tsutomu Iwashita, Osaka (JP); Yoshiaki Kurioka, Osaka (JP); Shinji Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 301 days.

(21) Appl. No.: 12/899,788

(22) Filed: Oct. 7, 2010

(65) Prior Publication Data

US 2011/0085247 A1    Apr. 14, 2011

(30) Foreign Application Priority Data

Oct. 13, 2009   (JP) .................................. 2009-236424
Oct. 13, 2009   (JP) .................................. 2009-236426

(51) Int. Cl.
    *G02B 15/14*   (2006.01)
(52) U.S. Cl. ........................................ 359/686; 359/676
(58) Field of Classification Search .................. 359/676, 359/680–682, 684, 687, 686
    See application file for complete search history.

(56) References Cited

U.S. PATENT DOCUMENTS

| | | | |
|---|---|---|---|
| 4,523,814 A * | 6/1985 | Okudaira | ....................... 359/687 |
| 6,606,200 B1 | 8/2003 | Nakayama et al. | |
| 2003/0161620 A1 | 8/2003 | Hagimori et al. | |
| 2004/0161228 A1 | 8/2004 | Nanba | |
| 2005/0275948 A1 | 12/2005 | Sueyoshi | |
| 2006/0051082 A1 | 3/2006 | Tamura | |
| 2006/0055815 A1 | 3/2006 | Nanjo et al. | |
| 2006/0215277 A1 | 9/2006 | Sato | |
| 2006/0274426 A1 | 12/2006 | Sueyoshi | |
| 2007/0201146 A1 | 8/2007 | Saruwatari | |
| 2007/0217026 A1 | 9/2007 | Nishimura | |
| 2008/0137218 A1 | 6/2008 | Omichi | |
| 2008/0239506 A1 | 10/2008 | Ori | |
| 2008/0247053 A1 | 10/2008 | Iwasawa | |
| 2008/0278824 A1 | 11/2008 | Shirota | |
| 2009/0002842 A1 | 1/2009 | Souma | |
| 2009/0034089 A1 | 2/2009 | Kawada et al. | |
| 2009/0103186 A1 | 4/2009 | Hankawa | |
| 2009/0122418 A1 | 5/2009 | Atsuumi et al. | |

FOREIGN PATENT DOCUMENTS

| | | |
|---|---|---|
| JP | 10-148757 A | 6/1998 |
| JP | 2003-202500 A | 7/2003 |
| JP | 2003-241088 A | 8/2003 |
| JP | 2004-012641 A | 1/2004 |
| JP | 2004-272187 A | 9/2004 |

(Continued)

*Primary Examiner* — James Greece
(74) *Attorney, Agent, or Firm* — Pearne & Gordon LLP

(57) ABSTRACT

A zoom lens system, in order from an object side to an image side, comprising a first lens unit having positive optical power, a second lens unit having negative optical power, a third lens unit having positive optical power, and subsequent lens units including a fourth lens unit having optical power, wherein any one of the first lens unit, the second lens unit, the third lens unit, and the subsequent lens units includes a lens element having a reflecting surface that bends a light beam incident from an object, wherein in zooming from a wide-angle limit to a telephoto limit at the time of image taking, the first lens unit and the third lens unit do not move along an optical axis, and wherein the condition is satisfied: $1.42 < nd_{4ave} < 1.58$ ($nd_{4ave}$ is an average of refractive indices to the d-line of the lens elements constituting the fourth lens unit), an imaging device and a camera are provided.

20 Claims, 25 Drawing Sheets

FOREIGN PATENT DOCUMENTS

| | | |
|---|---|---|
| JP | 2004-333768 A | 11/2004 |
| JP | 2004-354869 A | 12/2004 |
| JP | 2005-084283 A | 3/2005 |
| JP | 2005-128065 A | 5/2005 |
| JP | 2005-266173 A | 9/2005 |
| JP | 2005-352347 A | 12/2005 |
| JP | 2006-113453 A | 4/2006 |
| JP | 2006-215257 A | 8/2006 |
| JP | 2006-267862 A | 10/2006 |
| JP | 2006-317481 A | 11/2006 |
| JP | 2007-226142 A | 9/2007 |
| JP | 2007-248952 A | 9/2007 |
| JP | 2008-059000 A | 3/2008 |
| JP | 2008-065347 A | 3/2008 |
| JP | 2008-145529 A | 6/2008 |
| JP | 2008-191293 A | 8/2008 |
| JP | 2008-268833 A | 11/2008 |
| JP | 2008-281764 A | 11/2008 |
| JP | 2009-008845 A | 1/2009 |
| JP | 2009-037105 A | 2/2009 |
| JP | 2009-098458 A | 5/2009 |
| JP | 2009-139917 A | 6/2009 |

* cited by examiner

ZOOM LENS SYSTEM, IMAGING DEVICE AND CAMERA

CROSS-REFERENCE TO RELATED APPLICATION

This application is based on application Nos. 2009-236424 and 2009-236426 filed in Japan on Oct. 13, 2009, the contents of which are hereby incorporated by reference.

BACKGROUND OF THE INVENTION

1. Field of the Invention

The present invention relates to a zoom lens system, an imaging device, and a camera. In particular, the present invention relates to: a high-performance zoom lens system that has a high resolution and a relatively high zooming ratio and still has a short overall length of lens system (a distance on the optical axis, from an object side surface of a lens element located on the most object side of the lens system, to the image surface) because of a small number of lens elements constituting the lens system; an imaging device employing this zoom lens system; and a thin and compact camera employing this imaging device.

2. Description of the Background Art

Size reduction and performance improvement are strongly required of digital still cameras and digital video cameras (simply referred to as digital cameras, hereinafter) provided with an image sensor for performing photoelectric conversion. Particularly, in recent years, thin digital cameras are required in which top priority is imparted to storability and portability. As one of means for realizing such thin digital cameras, various zoom lens systems have been proposed in which a light beam incident from an object is bent.

Japanese Laid-Open Patent Publication No. 2006-267862 discloses a zoom lens, in order from the object side, comprising: a first lens unit having positive refractive power and including a reflecting member that bends the optical path at about 90 degrees; a second lens unit having negative refractive power; a third lens unit having positive refractive power and including a diaphragm on the most image surface side; and a fourth lens unit having positive refractive power. The second lens unit moves along the optical axis at the time of magnification change, and the fourth lens unit moves at the time of magnification change and focusing. The fourth lens unit comprises a cemented lens having negative refractive power and a positive meniscus lens. The ratio of the focal length of the second lens unit to the focal length of the entire system at a telephoto limit, and the ratio of the focal length of the fourth lens unit to the focal length of the entire system at a telephoto limit, are defined.

Japanese Laid-Open Patent Publication No. 2006-317481 discloses a variable magnification optical system, in order from the object side, comprising: a first lens unit having positive optical power; a second lens unit having negative optical power; a third lens unit having positive optical power; a fourth lens unit having positive optical power; and a fifth lens unit. At the time of magnification change from a wide-angle limit to a telephoto limit, the positions of the first lens unit, the third lens unit, and the fifth lens unit are fixed, and the second lens unit and the fourth lens units move. The fifth lens unit comprises a negative component and a positive component in order from the object side. The ratio of the axial air space between the negative component and the positive component to the axial thickness of the entire fifth lens unit is defined.

Japanese Laid-Open Patent Publication No. 2008-268833 discloses a variable magnification optical system, in order from the object side, comprising: a first lens unit having positive refractive power and being fixed at the time of magnification change and focusing; a second lens unit having negative refractive power and moving at the time of magnification change; a third lens unit having positive refractive power and being fixed at the time of magnification change and focusing; a fourth lens unit having positive refractive power, having a focusing function, and moving at the time of magnification change; and a fifth lens unit having negative refractive power and moving at the time of magnification change. The ratio of the focal length of the first lens unit to the focal length of the entire system at a wide-angle limit, and the ratio of the focal length of the second lens unit to the focal length of the entire system at a wide-angle limit, are defined.

Japanese Patent Publication No. 4264842 discloses a zoom lens including a reflecting member for bending the optical axis passing through a plurality of lens units, and comprising: in order from the object side to the image side, a first lens unit having positive refractive power and being fixed at a position; a second lens unit having negative refractive power and moving along the optical axis at the time of magnification change; a third lens unit having positive refractive power and being fixed at a position; a fourth lens unit having positive refractive power, compensating position variation of the image surface at the time of magnification change, and moving along the optical axis for focusing; and a fifth lens unit having negative refractive power and being fixed at a position at the time of magnification change. The ratio of the focal length of the first lens unit to the focal length of the entire system at a wide-angle limit, and the ratio of the focal length of the third lens unit to the focal length of the entire system at a wide-angle limit, are defined.

However, among the zoom lenses and the variable magnification optical systems disclosed in the above-mentioned patent documents, some have a relatively short overall length of lens system because of a small number of lens elements constituting the lens system but have a low zooming ratio less than 3, while others have a relatively high zooming ratio but have an undesirably long overall length of lens system because of a large number of lens elements constituting the lens system. Thus, these zoom lenses and variable magnification optical systems do not satisfy the requirements for digital cameras in recent years.

SUMMARY OF THE INVENTION

An object of the present invention is to provide: a high-performance zoom lens system that has a high resolution and a relatively high zooming ratio and still has a short overall length of lens system because of a small number of lens elements constituting the lens system; an imaging device employing this zoom lens system; and a thin and compact camera employing this imaging device.

(I) The novel concepts disclosed herein were achieved in order to solve the foregoing problems in the conventional art, and herein is disclosed:

a zoom lens system, in order from an object side to an image side, comprising a first lens unit having positive optical power, a second lens unit having negative optical power, a third lens unit having positive optical power, and subsequent lens units including a fourth lens unit having optical power, wherein any one of the first lens unit, the second lens unit, the third lens unit, and the subsequent lens units includes a lens element having a reflecting surface that bends a light beam incident from an object, wherein in zooming from a wide-angle limit to a telephoto limit at the time of image taking, the first lens unit and the third lens unit do not move along an optical axis, and wherein the following condition (1) is satisfied:

$$1.42 < nd_{4ave} < 1.58 \tag{1}$$

where, $nd_{4ave}$ is an average of refractive indices to the d-line of the lens elements constituting the fourth lens unit.

The novel concepts disclosed herein were achieved in order to solve the foregoing problems in the conventional art, and herein is disclosed:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, and subsequent lens units including a fourth lens unit having optical power, wherein any one of the first lens unit, the second lens unit, the third lens unit, and the subsequent lens units includes a lens element having a reflecting surface that bends a light beam incident from an object, wherein in zooming from a wide-angle limit to a telephoto limit at the time of image taking, the first lens unit and the third lens unit do not move along an optical axis, and wherein the following condition (1) is satisfied:

$$1.42 < nd_{4ave} < 1.58 \tag{1}$$

where, $nd_{4ave}$ is an average of refractive indices to the d-line of the lens elements constituting the fourth lens unit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, and subsequent lens units including a fourth lens unit having optical power, wherein any one of the first lens unit, the second lens unit, the third lens unit, and the subsequent lens units includes a lens element having a reflecting surface that bends a light beam incident from an object, wherein in zooming from a wide-angle limit to a telephoto limit at the time of image taking, the first lens unit and the third lens unit do not move along an optical axis, and wherein the following condition (1) is satisfied:

$$1.42 < nd_{4ave} < 1.58 \tag{1}$$

where, $nd_{4ave}$ is an average of refractive indices to the d-line of the lens elements constituting the fourth lens unit.

The novel concepts disclosed herein were achieved in order to solve the foregoing problems in the conventional art, and herein is disclosed:

a zoom lens system, in order from an object side to an image side, comprising a first lens unit having positive optical power, a second lens unit having negative optical power, a third lens unit having positive optical power, and subsequent lens units including a fourth lens unit having optical power, wherein any one of the first lens unit, the second lens unit, the third lens unit, and the subsequent lens units includes a lens element having a reflecting surface that bends a light beam incident from an object, wherein in zooming from a wide-angle limit to a telephoto limit at the time of image taking, the first lens unit and the third lens unit do not move along an optical axis, and wherein at least one of all the lens elements constituting the fourth lens unit satisfies the following conditions (2-1) and (2-2), simultaneously:

$$1.42 < nd_4 < 1.66 \tag{2-1}$$

$$15 < vd_4 < 36 \tag{2-2}$$

where, nd4 is a refractive index to the d-line of any of the lens elements constituting the fourth lens unit, and $vd_4$ is an Abbe number to the d-line of any of the lens elements constituting the fourth lens unit.

The novel concepts disclosed herein were achieved in order to solve the foregoing problems in the conventional art, and herein is disclosed:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, and subsequent lens units including a fourth lens unit having optical power, wherein any one of the first lens unit, the second lens unit, the third lens unit, and the subsequent lens units includes a lens element having a reflecting surface that bends a light beam incident from an object, wherein in zooming from a wide-angle limit to a telephoto limit at the time of image taking, the first lens unit and the third lens unit do not move along an optical axis, and wherein at least one of all the lens elements constituting the fourth lens unit satisfies the following conditions (2-1) and (2-2), simultaneously:

$$1.42 < nd_4 < 1.66 \tag{2-1}$$

$$15 < vd_4 < 36 \tag{2-2}$$

where, nd4 is a refractive index to the d-line of any of the lens elements constituting the fourth lens unit, and $vd_4$ is an Abbe number to the d-line of any of the lens elements constituting the fourth lens unit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, and subsequent lens units including a fourth lens unit having optical power, wherein any one of the first lens unit, the second lens unit, the third lens unit, and the subsequent lens units includes a lens element having a reflecting surface that bends a light beam incident from an object, wherein in zooming from a wide-angle limit to a telephoto limit at the time of image taking, the first lens unit and the third lens unit do not move along an optical axis, and wherein at least one of all the lens elements constituting the fourth lens unit satisfies the following conditions (2-1) and (2-2), simultaneously:

$$1.42 < nd_4 < 1.66 \quad (2\text{-}1)$$

$$15 < vd_4 < 36 \quad (2\text{-}2)$$

where, nd4 is a refractive index to the d-line of any of the lens elements constituting the fourth lens unit, and $vd_4$ is an Abbe number to the d-line of any of the lens elements constituting the fourth lens unit.

(II) The novel concepts disclosed herein were achieved in order to solve the foregoing problems in the conventional art, and herein is disclosed:

a zoom lens system, in order from an object side to an image side, comprising a first lens unit having positive optical power, a second lens unit having negative optical power, a third lens unit having positive optical power, a fourth lens unit having optical power, and a fifth lens unit having optical power, wherein any one of the first lens unit, the second lens unit, the third lens unit, the fourth lens unit, and the fifth lens unit includes a lens element having a reflecting surface that bends a light beam incident from an object, wherein in zooming from a wide-angle limit to a telephoto limit at the time of image taking, the first lens unit, the third lens unit, and the fifth lens unit do not move along an optical axis, wherein an aperture diaphragm is arranged between the third lens unit and the fourth lens unit, and wherein at least two of all the lens elements constituting the lens system satisfy the following conditions (3-1) and (4-1), simultaneously:

$$vd < 59 \quad (3\text{-}1)$$

$$\left.\begin{array}{l}\text{when } vd < 34 \\ 0.000 < PgF + 0.0038 \times vd - 0.725 \\ \text{when } 34 \leq vd < 59 \\ 0.000 < PgF + 0.0020 \times vd - 0.664\end{array}\right\} \quad (4\text{-}1)$$

where, vd is an Abbe number to the d-line of any of the lens elements constituting the lens system, PgF is a partial dispersion ratio of any of the lens elements constituting the lens system, which is represented by the following equation:

$$PgF=(ng-nF)/(nF-nC),$$

ng is a refractive index to the g-line, nF is a refractive index to the F-line, and nC is a refractive index to the C-line.

The novel concepts disclosed herein were achieved in order to solve the foregoing problems in the conventional art, and herein is disclosed:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, a fourth lens unit having optical power, and a fifth lens unit having optical power, wherein any one of the first lens unit, the second lens unit, the third lens unit, the fourth lens unit, and the fifth lens unit includes a lens element having a reflecting surface that bends a light beam incident from an object, wherein in zooming from a wide-angle limit to a telephoto limit at the time of image taking, the first lens unit, the third lens unit, and the fifth lens unit do not move along an optical axis, wherein an aperture diaphragm is arranged between the third lens unit and the fourth lens unit, and wherein at least two of all the lens elements constituting the lens system satisfy the following conditions (3-1) and (4-1), simultaneously:

$$vd < 59 \quad (3\text{-}1)$$

$$\left.\begin{array}{l}\text{when } vd < 34 \\ 0.000 < PgF + 0.0038 \times vd - 0.725 \\ \text{when } 34 \leq vd < 59 \\ 0.000 < PgF + 0.0020 \times vd - 0.664\end{array}\right\} \quad (4\text{-}1)$$

where, vd is an Abbe number to the d-line of any of the lens elements constituting the lens system, PgF is a partial dispersion ratio of any of the lens elements constituting the lens system, which is represented by the following equation:

$$PgF=(ng-nF)/(nF-nC),$$

ng is a refractive index to the g-line, nF is a refractive index to the F-line, and nC is a refractive index to the C-line.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, a fourth lens unit having optical power, and a fifth lens unit having optical power, wherein any one of the first lens unit, the second lens unit, the third lens unit, the fourth lens unit, and the fifth lens unit includes a lens element having a reflecting surface that bends a light beam incident from an object, wherein in zooming from a wide-angle limit to a telephoto limit at the time of image taking, the first lens unit, the third lens unit, and the fifth lens unit do not move along an optical axis, wherein an aperture diaphragm is arranged between the third lens unit and the fourth lens unit, and wherein at least two of all the lens elements constituting the lens system satisfy the following conditions (3-1) and (4-1), simultaneously:

$$vd < 59 \qquad (3\text{-}1)$$

$$\left.\begin{array}{l} \text{when } vd < 34 \\ 0.000 < PgF + 0.0038 \times vd - 0.725 \\ \text{when } 34 \le vd < 59 \\ 0.000 < PgF + 0.0020 \times vd - 0.664 \end{array}\right\} \qquad (4\text{-}1)$$

where, vd is an Abbe number to the d-line of any of the lens elements constituting the lens system, PgF is a partial dispersion ratio of any of the lens elements constituting the lens system, which is represented by the following equation:

$$PgF=(ng-nF)/(nF-nC),$$

ng is a refractive index to the g-line,
nF is a refractive index to the F-line, and
nC is a refractive index to the C-line.

The novel concepts disclosed herein were achieved in order to solve the foregoing problems in the conventional art, and herein is disclosed:

a zoom lens system, in order from an object side to an image side, comprising a first lens unit having positive optical power, a second lens unit having negative optical power, a third lens unit having positive optical power, a fourth lens unit having optical power, and a fifth lens unit having optical power, wherein any one of the first lens unit, the second lens unit, the third lens unit, the fourth lens unit, and the fifth lens unit includes a lens element having a reflecting surface that bends a light beam incident from an object, wherein in zooming from a wide-angle limit to a telephoto limit at the time of image taking, the first lens unit, the third lens unit, and the fifth lens unit do not move along an optical axis, wherein an aperture diaphragm is arranged between the third lens unit and the fourth lens unit, and wherein at least one of all the lens elements constituting the third lens unit satisfies the following conditions (3-2) and (4-2), simultaneously:

$$vd_3 < 59 \qquad (3\text{-}2)$$

-continued $$\left.\begin{array}{l} \text{when } vd_3 < 34 \\ 0.000 < PgF_3 + 0.0038 \times vd_3 - 0.725 \\ \text{when } 34 \le vd_3 < 59 \\ 0.000 < PgF_3 + 0.0020 \times vd_3 - 0.664 \end{array}\right\} \qquad (4\text{-}2)$$

where, $vd_3$ is an Abbe number to the d-line of any of the lens elements constituting the third lens unit, PgF3 is a partial dispersion ratio of any of the lens elements constituting the third lens unit, which is represented by the following equation:

$$PgF_3=(ng-nF)/(nF-nC),$$

ng is a refractive index to the g-line,
nF is a refractive index to the F-line, and
nC is a refractive index to the C-line.

The novel concepts disclosed herein were achieved in order to solve the foregoing problems in the conventional art, and herein is disclosed:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, a fourth lens unit having optical power, and a fifth lens unit having optical power, wherein any one of the first lens unit, the second lens unit, the third lens unit, the fourth lens unit, and the fifth lens unit includes a lens element having a reflecting surface that bends a light beam incident from an object, wherein in zooming from a wide-angle limit to a telephoto limit at the time of image taking, the first lens unit, the third lens unit, and the fifth lens unit do not move along an optical axis, wherein an aperture diaphragm is arranged between the third lens unit and the fourth lens unit, and wherein at least one of all the lens elements constituting the third lens unit satisfies the following conditions (3-2) and (4-2), simultaneously:

$$vd_3 < 59 \qquad (3\text{-}2)$$

$$\left.\begin{array}{l} \text{when } vd_3 < 34 \\ 0.000 < PgF_3 + 0.0038 \times vd_3 - 0.725 \\ \text{when } 34 \le vd_3 < 59 \\ 0.000 < PgF_3 + 0.0020 \times vd_3 - 0.664 \end{array}\right\} \qquad (4\text{-}2)$$

where, $vd_3$ is an Abbe number to the d-line of any of the lens elements constituting the third lens unit, PgF3 is a partial dispersion ratio of any of the lens elements constituting the third lens unit, which is represented by the following equation:

$$PgF_3=(ng-nF)/(nF-nC),$$

ng is a refractive index to the g-line,
nF is a refractive index to the F-line, and
nC is a refractive index to the C-line.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, a fourth lens unit having optical power, and a fifth lens unit having optical power, wherein any one of the first lens unit, the second lens unit, the third lens unit, the fourth lens unit, and the fifth lens unit includes a lens element having a reflecting surface that bends a light beam incident from an object, wherein in zooming from a wide-angle limit to a telephoto limit at the time of image taking, the first lens unit, the third lens unit, and the fifth lens unit do not move along an optical axis, wherein an aperture diaphragm is arranged between the third lens unit and the fourth lens unit, and wherein at least one of all the lens elements constituting the third lens unit satisfies the following conditions (3-2) and (4-2), simultaneously:

$$vd_3 < 59 \quad (3\text{-}2)$$

$$\left.\begin{array}{l} \text{when } vd_3 < 34 \\ 0.000 < PgF_3 + 0.0038 \times vd_3 - 0.725 \\ \text{when } 34 \le vd_3 < 59 \\ 0.000 < PgF_3 + 0.0020 \times vd_3 - 0.664 \end{array}\right\} \quad (4\text{-}2)$$

where, $vd_3$ is an Abbe number to the d-line of any of the lens elements constituting the third lens unit, PgF3 is a partial dispersion ratio of any of the lens elements constituting the third lens unit, which is represented by the following equation:

$$PgF_3 = (ng-nF)/(nF-nC),$$

ng is a refractive index to the g-line,
nF is a refractive index to the F-line, and
nC is a refractive index to the C-line.

The present invention provides: a high-performance zoom lens system that has a high resolution and a relatively high zooming ratio and still has a short overall length of lens system because of a small number of lens elements constituting the lens system; an imaging device employing this zoom lens system; and a thin and compact camera employing this imaging device.

BRIEF DESCRIPTION OF THE DRAWINGS

This and other objects and features of this invention will become clear from the following description, taken in conjunction with the preferred embodiments with reference to the accompanied drawings in which.

Figure 1:
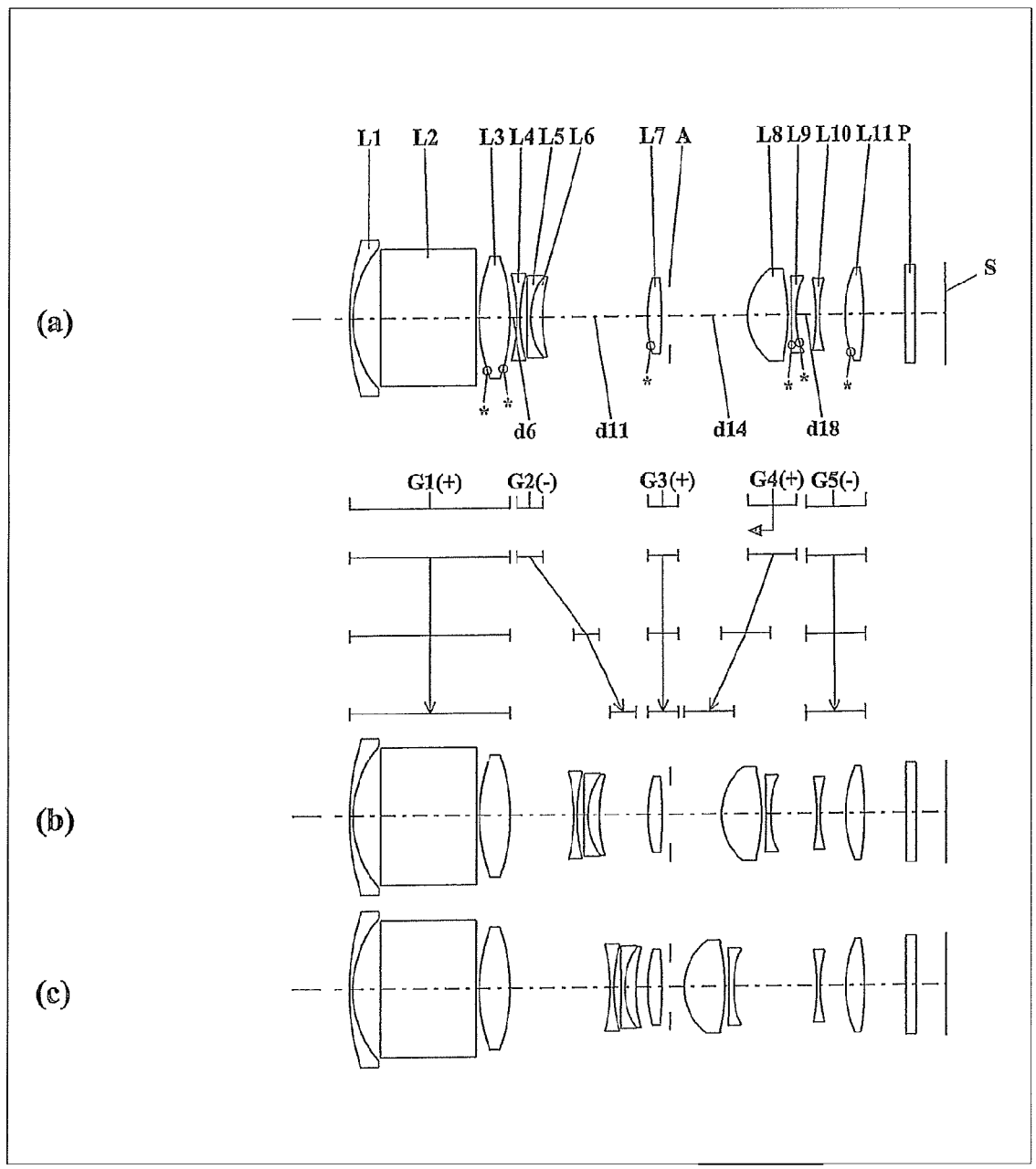
FIG. 1 is a lens arrangement diagram showing an infinity in-focus condition of a zoom lens system according to Embodiment 1 (Example 1)
Figure 2:
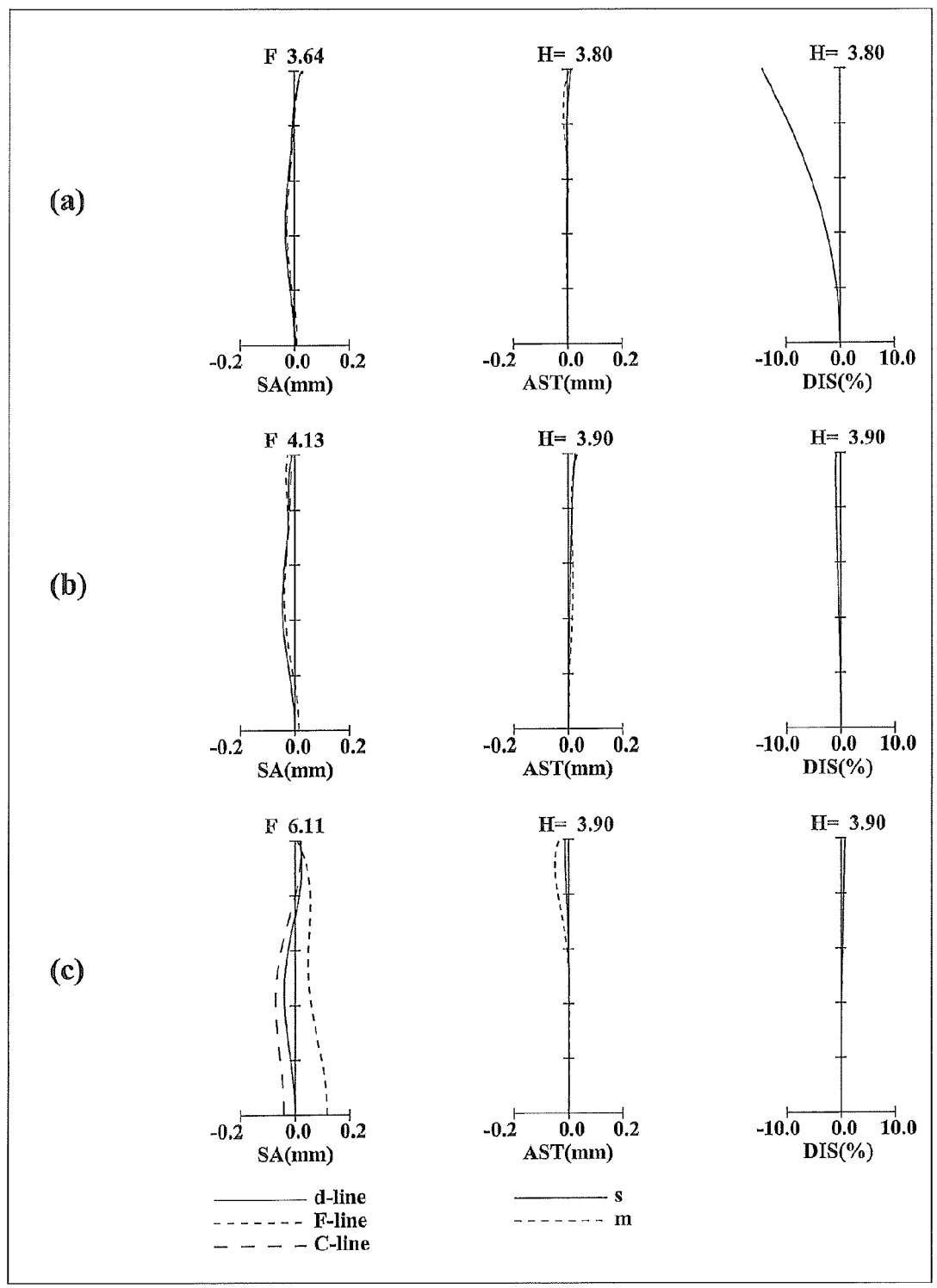
FIG. 2 is a longitudinal aberration diagram of an infinity in-focus condition of a zoom lens system according to Example 1.
Figure 3:
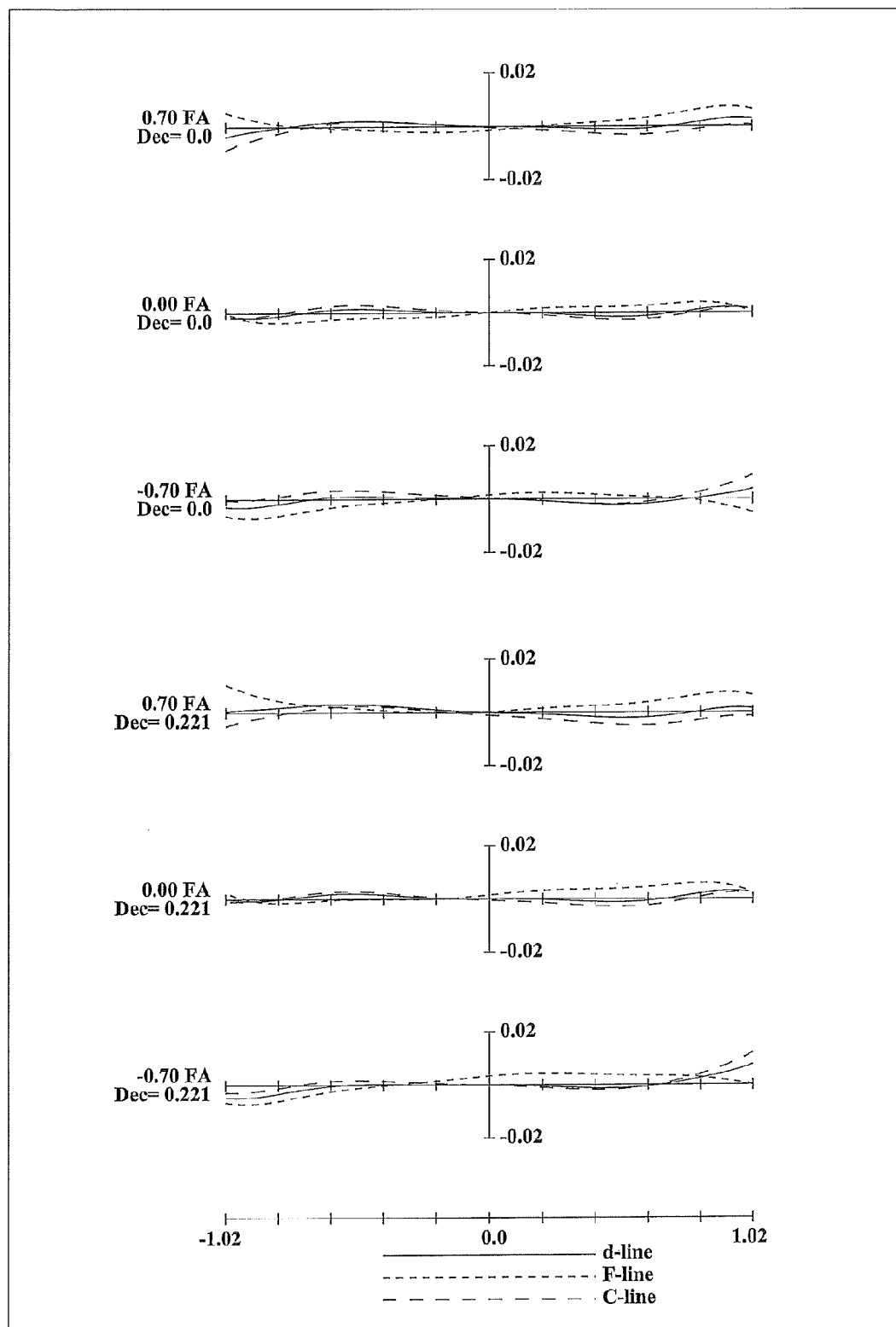
FIG. 3 is a lateral aberration diagram of a zoom lens system according to Example 1 at a telephoto limit in a basic state where image blur compensation is not performed and in a blur compensation state.

DESCRIPTION OF THE PREFERRED EMBODIMENTS (Embodiments 1 to 8)

FIGS. 1, 4, 7, 10, 13, 16, 19, and 22 are lens arrangement diagrams of zoom lens systems according to Embodiments 1 to 8, respectively.

Each of FIGS. 1, 4, 7, 10, 13, 16, 19, and 22 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M=\sqrt{(f_W \cdot f_T)}$), and part (c) shows a lens configuration at a telephoto limit (in the maximum focal length condition: focal length $f_T$). Further, in each Fig., each bend arrow located between part (a) and part (b) indicates a line obtained by connecting the positions of the lens units respectively at a wide-angle limit, a middle position, and a telephoto limit, in order from the top. In the part between the wide-angle limit and the middle position, and the part between the middle position and the telephoto limit, the positions are connected simply with a straight line, and hence this line does not indicate actual motion of each lens unit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises: a first lens unit G1 having positive optical power; a second lens unit G2 having negative optical power; a third lens unit G3 having positive optical power; a fourth lens unit G4 having positive optical power; and a fifth lens unit G5 having negative optical power. A second lens element L2 (prism) in the first lens unit G1 corresponds to a lens element having a reflecting surface for bending a light beam incident from an object, that is, bending an axial principal ray incident from the object at approximately 90°. The position of the reflecting surface is not shown in the figure. Although, in the zoom lens system according to each embodiment, the lens element having a reflecting surface is a prism, the lens element having a reflecting surface may be, for example, a mirror element. Further, the prism employed in the zoom lens system according to each embodiment has a planar incident surface and a planar exiting surface as described later. Instead, depending on the lens configuration, at least one of the incident surface and the exiting surface may be convex or concave.

In zooming, the second lens unit G2 and the fourth lens unit G4 respectively move in a direction along the optical axis such that the intervals between the lens units, that is, the interval between the first lens unit G1 and the second lens unit G2, the interval between the second lens unit G2 and the third lens unit G3, the interval between the third lens unit G3 and the fourth lens unit G4, and the interval between the fourth lens unit G4 and the fifth lens unit G5 should all vary. In the zoom lens system according to each embodiment, when these lens units are arranged in a desired optical power configuration, high optical performance is obtained and still size reduction is achieved in the entire lens system.

Further, in FIGS. 1, 4, 7, 10, 13, 16, 19, and 22, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the fifth lens unit G5), a plane parallel plate P equivalent to an optical low-pass filter or a face plate of an image sensor is provided.

Further, in FIGS. 1, 4, 7, 10, 13, 16, 19, and 22, an aperture diaphragm A is provided on the most image side of the third lens unit G3, that is, between the third lens unit G3 and the fourth lens unit G4. In zooming from a wide-angle limit to a telephoto limit at the time of image taking, the aperture diaphragm A does not move along the optical axis. That is, the aperture diaphragm A is fixed relative to the image surface S together with the third lens unit G3.

As shown in FIG. 1, in the zoom lens system according to Embodiment 1, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; and a bi-convex third lens element L3. Among these, the third lens element L3 has two aspheric surfaces.

In the zoom lens system according to Embodiment 1, the second lens unit G2, in order from the object side to the image side, comprises: a bi-concave fourth lens element L4; a bi-concave fifth lens element L5; and a positive meniscus sixth lens element L6 with the convex surface facing the object side. Among these, the fifth lens element L5 and the sixth lens element L6 are cemented with each other.

Further, in the zoom lens system according to Embodiment 1, the third lens unit G3 comprises solely a bi-convex seventh lens element L7. The seventh lens element L7 has an aspheric object side surface.

Further, in the zoom lens system according to Embodiment 1, the fourth lens unit G4, in order from the object side to the image side, comprises: a bi-convex eighth lens element L8; and a negative meniscus ninth lens element L9 with the convex surface facing the object side. Among these, the ninth lens element L9 has two aspheric surfaces.

Further, in the zoom lens system according to Embodiment 1, the fifth lens unit G5, in order from the object side to the image side, comprises: a bi-concave tenth lens element L10; and a bi-convex eleventh lens element L11. Among these, the eleventh lens element L11 has an aspheric object side surface.

In the zoom lens system according to Embodiment 1, a plane parallel plate P is provided on the object side relative to the image surface S (that is, between the image surface S and the eleventh lens element L11).

In the zoom lens system according to Embodiment 1, in zooming from a wide-angle limit to a telephoto limit at the time of image taking, the second lens unit G2 moves nearly monotonically to the image side, the fourth lens unit G4 moves nearly monotonically to the object side, and the first lens unit G1, the third lens unit G3, and the fifth lens unit G5 are fixed relative to the image surface S. That is, in zooming, the second lens unit G2 and the fourth lens unit G4 individually move along the optical axis such that the interval between the first lens unit G1 and the second lens unit G2 and the interval between the fourth lens unit G4 and the fifth lens unit G5 should increase, and the interval between the second lens unit G2 and the third lens unit G3 and the interval between the third lens unit G3 and the fourth lens unit G4 should decrease.

Figure 4:
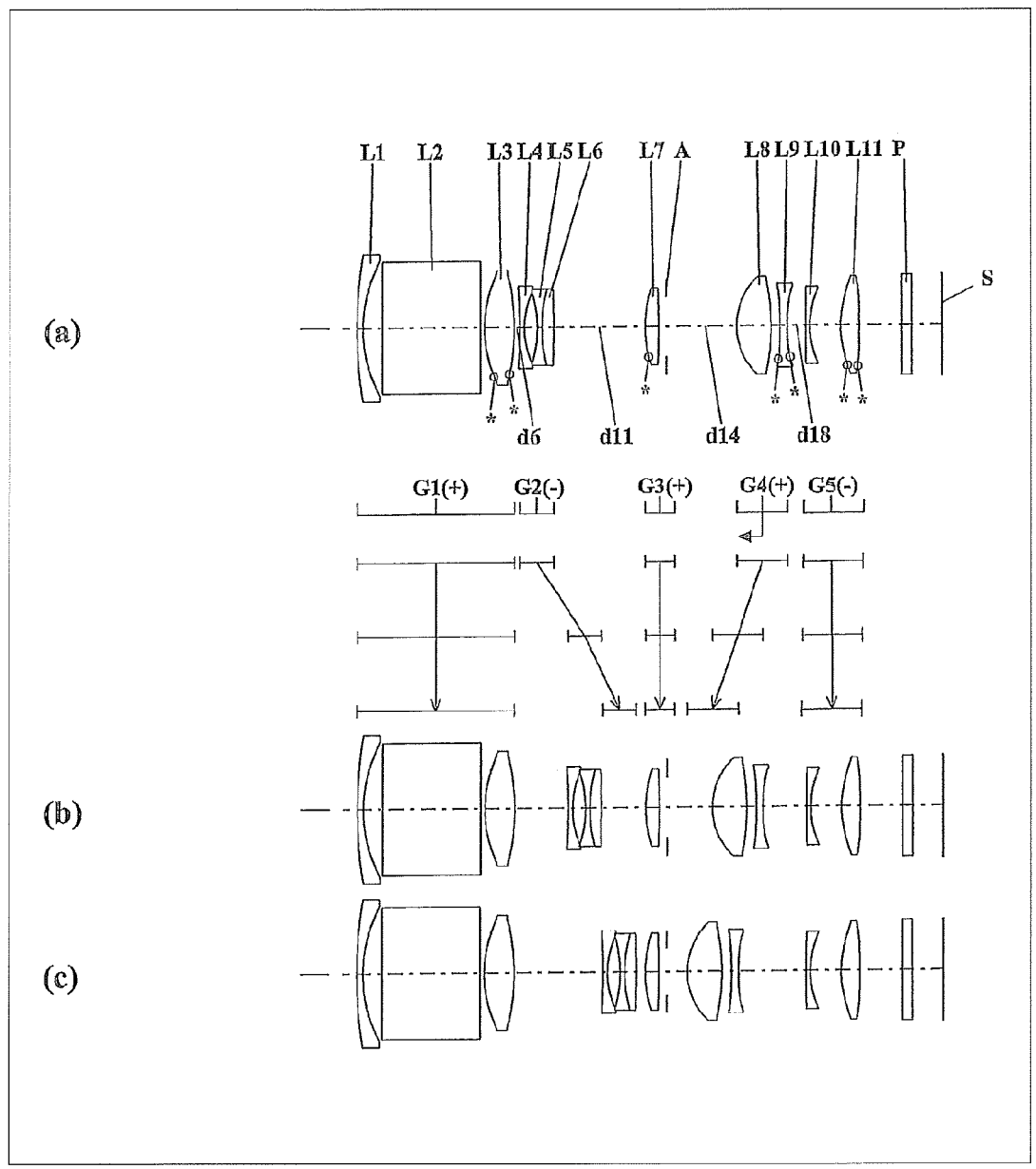
FIG. 4 is a lens arrangement diagram showing an infinity in-focus condition of a zoom lens system according to Embodiment 2 (Example 2)
Figure 5:
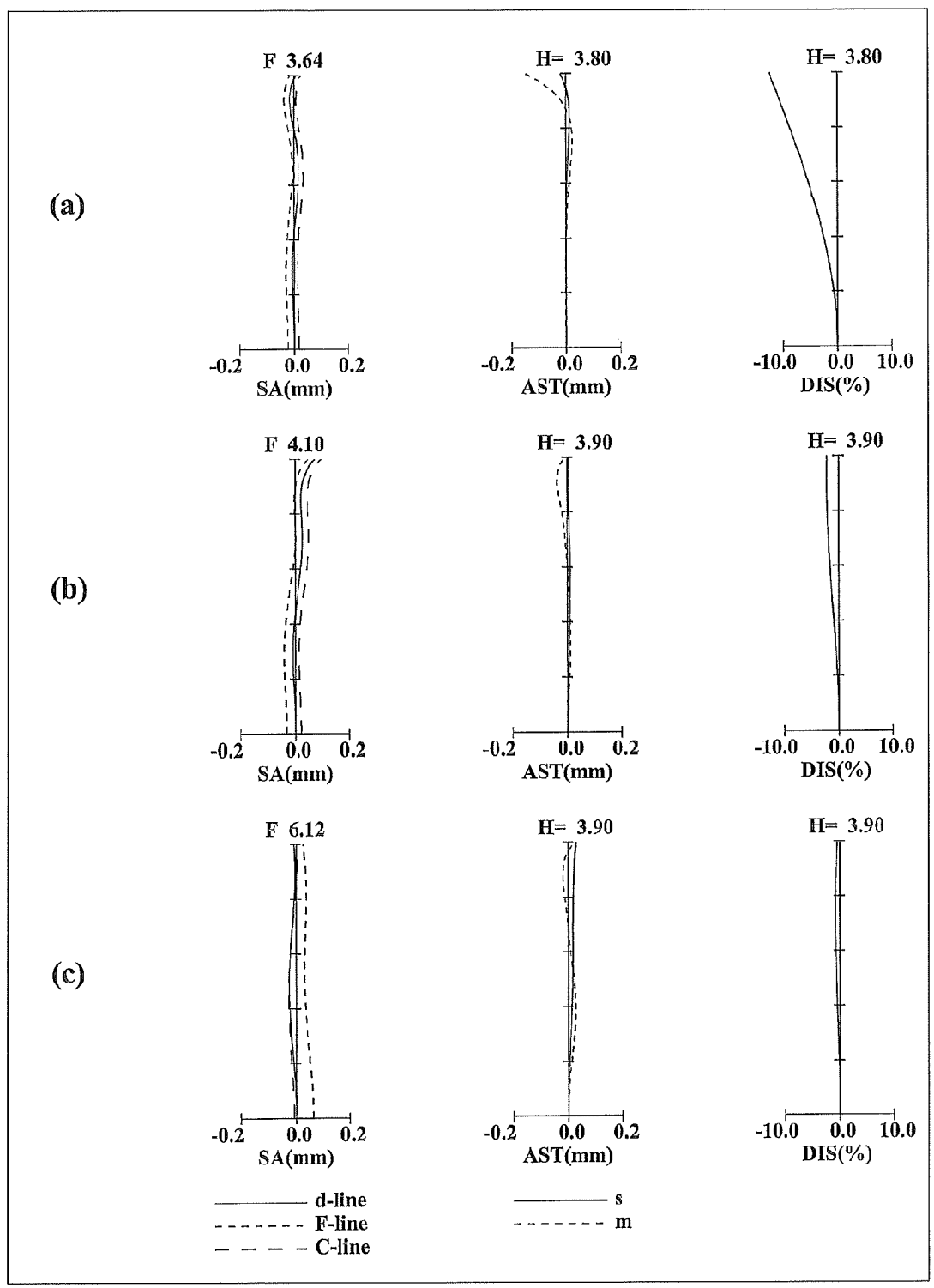
FIG. 5 is a longitudinal aberration diagram of an infinity in-focus condition of a zoom lens system according to Example 2.
Figure 6:
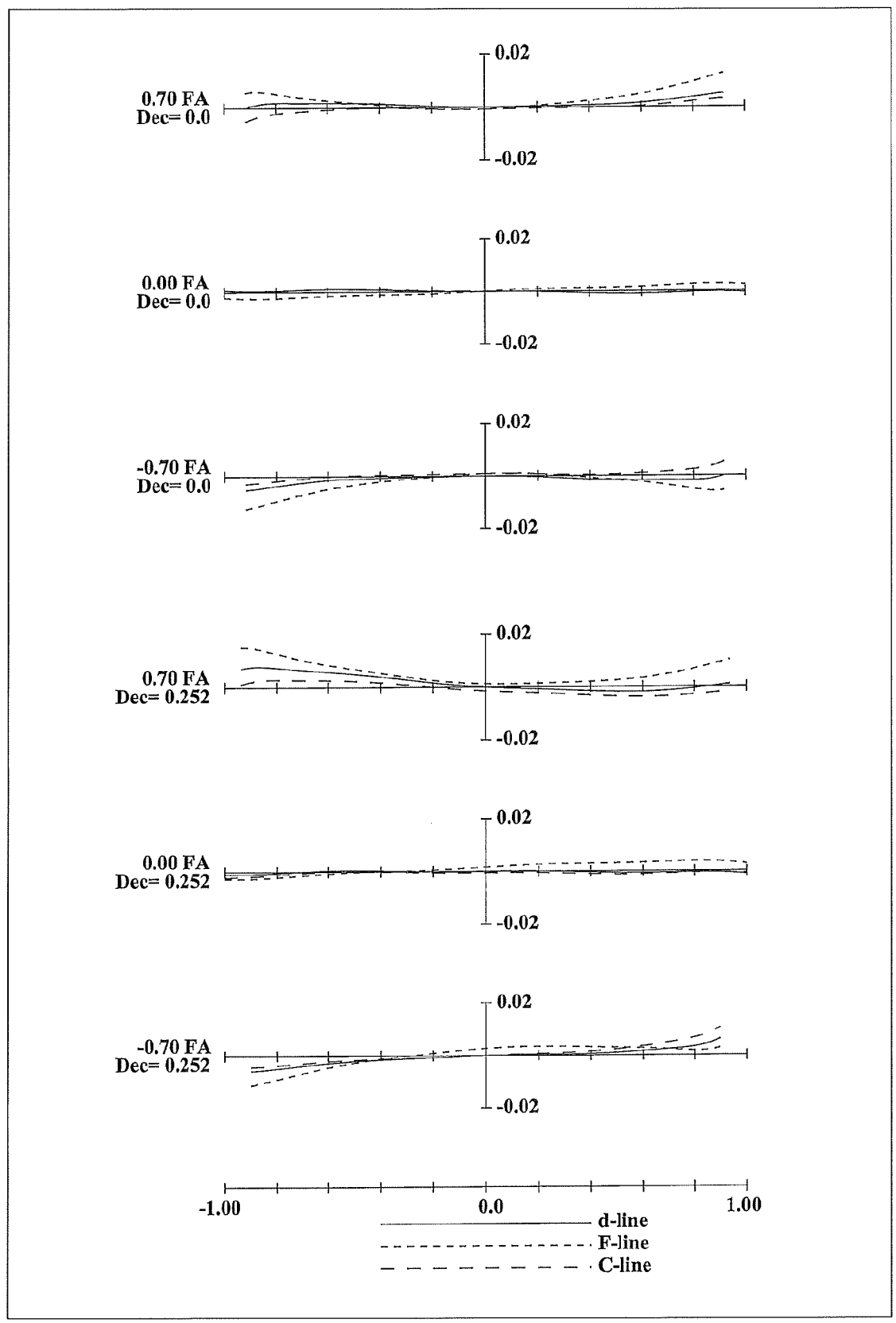
FIG. 6 is a lateral aberration diagram of a zoom lens system according to Example 2 at a telephoto limit in a basic state where image blur compensation is not performed and in a blur compensation state.

As shown in FIG. 4, in the zoom lens system according to Embodiment 2, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; and a bi-convex third lens element L3. Among these, the third lens element L3 has two aspheric surfaces.

In the zoom lens system according to Embodiment 2, the second lens unit G2, in order from the object side to the image side, comprises: a bi-concave fourth lens element L4; a bi-concave fifth lens element L5; and a bi-convex sixth lens element L6. Among these, the fifth lens element L5 and the sixth lens element L6 are cemented with each other.

Further, in the zoom lens system according to Embodiment 2, the third lens unit G3 comprises solely a bi-convex seventh lens element L7. The seventh lens element L7 has an aspheric object side surface.

Further, in the zoom lens system according to Embodiment 2, the fourth lens unit G4, in order from the object side to the image side, comprises: a bi-convex eighth lens element L8; and a bi-concave ninth lens element L9. Among these, the ninth lens element L9 has two aspheric surfaces.

Further, in the zoom lens system according to Embodiment 2, the fifth lens unit G5, in order from the object side to the image side, comprises: a negative meniscus tenth lens element L10 with the convex surface facing the object side; and a positive meniscus eleventh lens element L11 with the convex surface facing the object side. Among these, the eleventh lens element L11 has two aspheric surfaces.

In the zoom lens system according to Embodiment 2, a plane parallel plate P is provided on the object side relative to the image surface S (that is, between the image surface S and the eleventh lens element L11).

In the zoom lens system according to Embodiment 2, in zooming from a wide-angle limit to a telephoto limit at the time of image taking, the second lens unit G2 moves nearly monotonically to the image side, the fourth lens unit G4 moves nearly monotonically to the object side, and the first lens unit G1, the third lens unit G3, and the fifth lens unit G5 are fixed relative to the image surface S. That is, in zooming, the second lens unit G2 and the fourth lens unit G4 individually move along the optical axis such that the interval between the first lens unit G1 and the second lens unit G2 and the interval between the fourth lens unit G4 and the fifth lens unit G5 should increase, and the interval between the second lens unit G2 and the third lens unit G3 and the interval between the third lens unit G3 and the fourth lens unit G4 should decrease.

Figure 7:
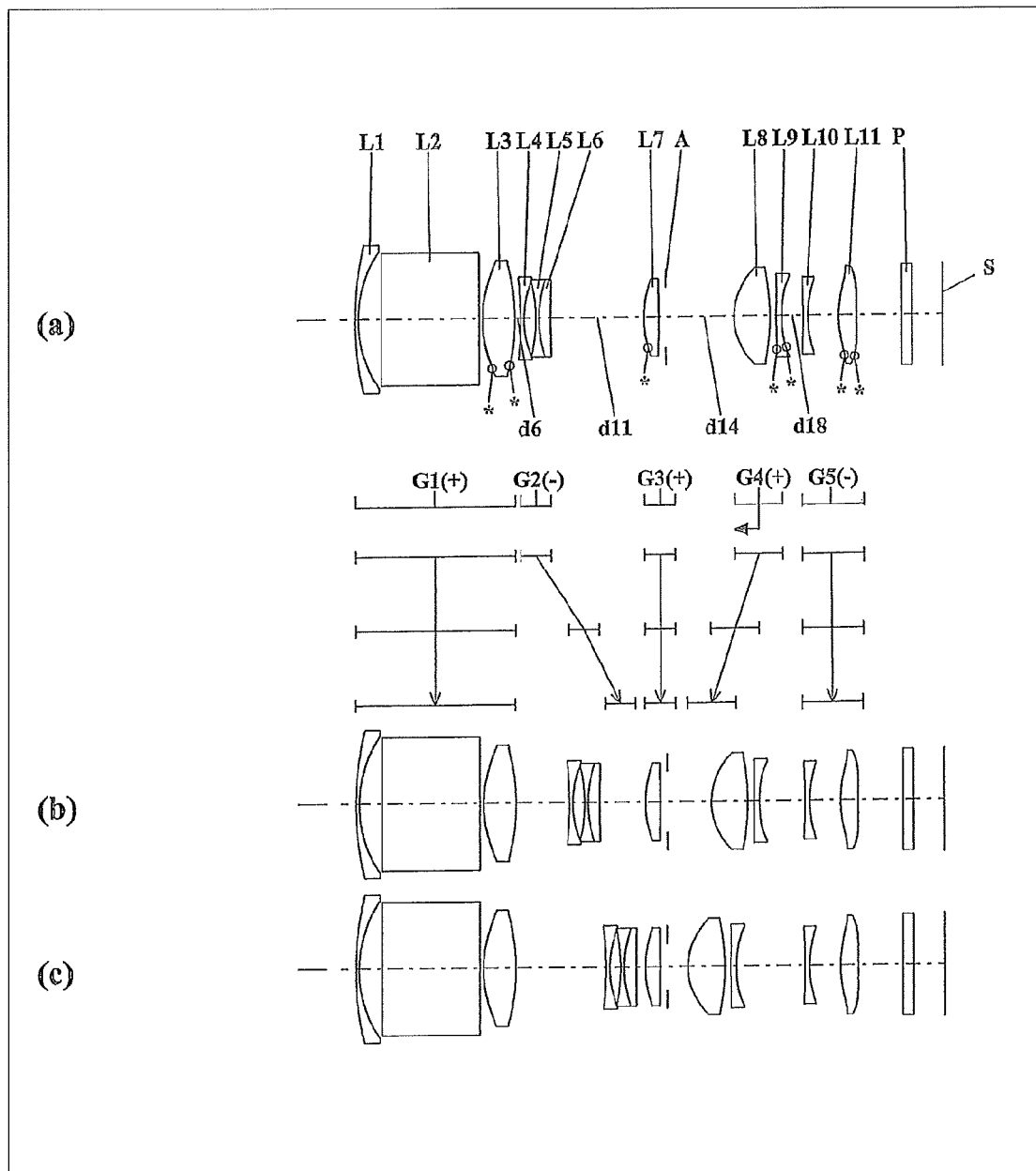
FIG. 7 is a lens arrangement diagram showing an infinity in-focus condition of a zoom lens system according to Embodiment 3 (Example 3)
Figure 8:
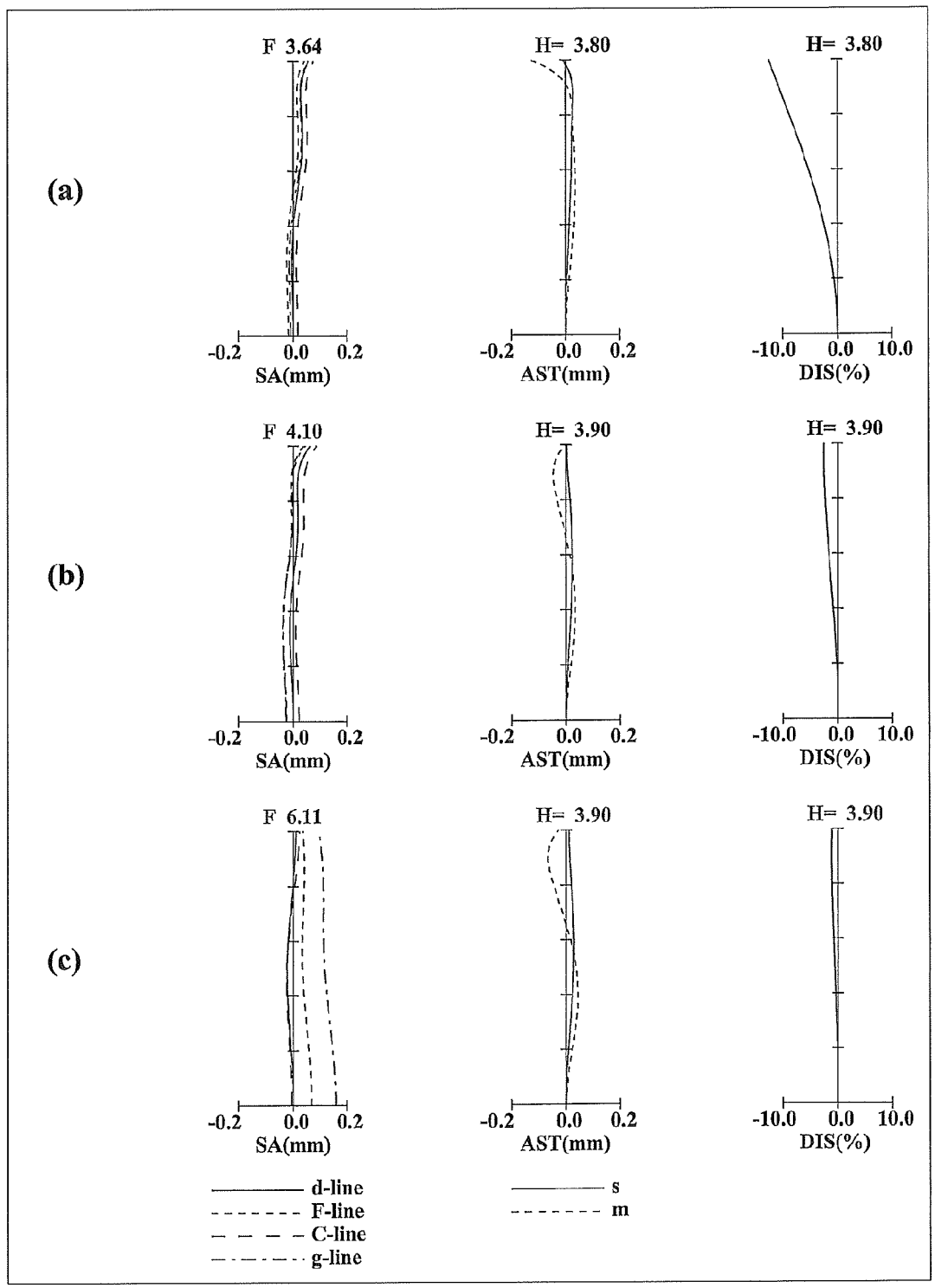
FIG. 8 is a longitudinal aberration diagram of an infinity in-focus condition of a zoom lens system according to Example 3.
Figure 9:
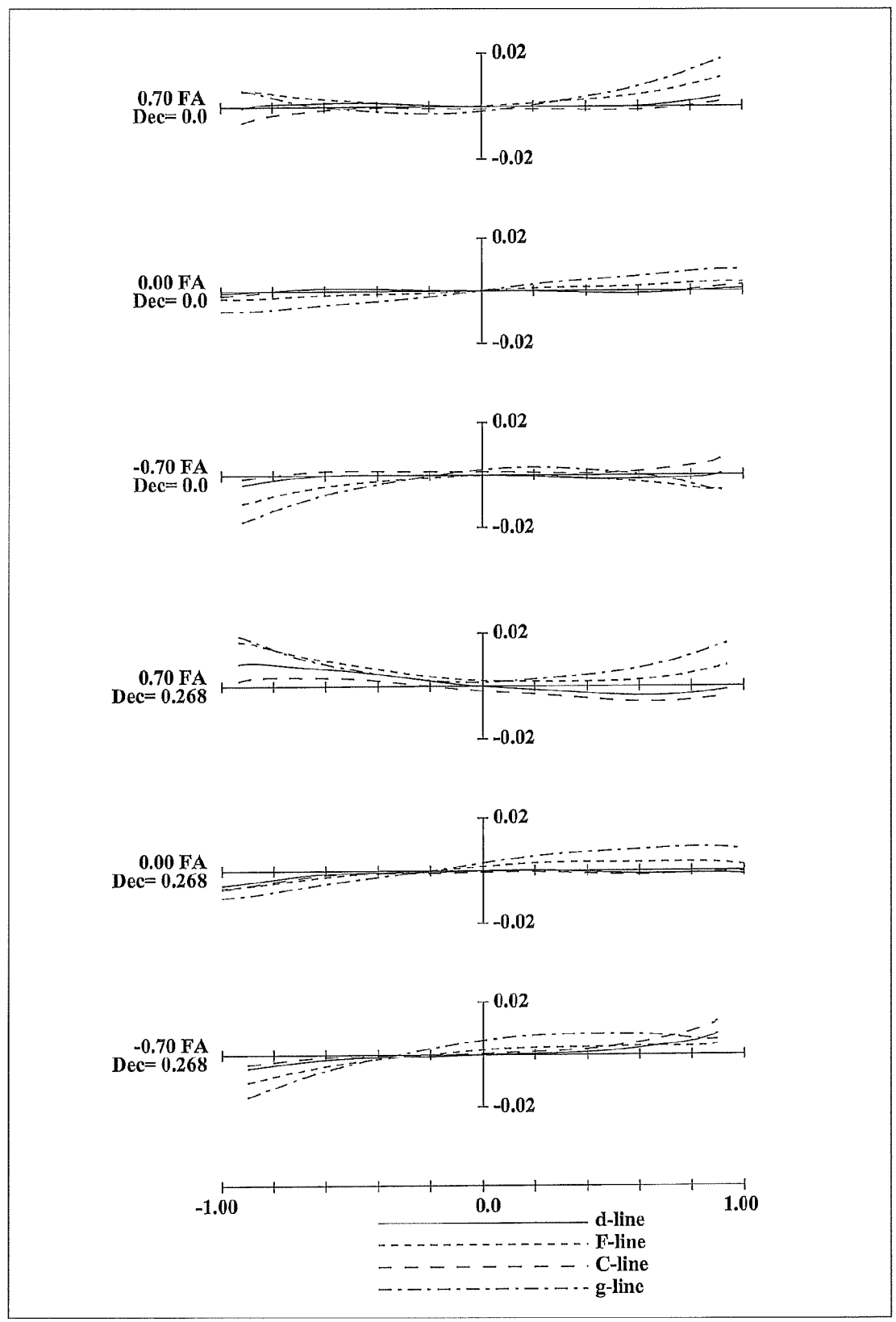
FIG. 9 is a lateral aberration diagram of a zoom lens system according to Example 3 at a telephoto limit in a basic state where image blur compensation is not performed and in a blur compensation state.

As shown in FIG. 7, in the zoom lens system according to Embodiment 3, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; and a bi-convex third lens element L3. Among these, the third lens element L3 has two aspheric surfaces.

In the zoom lens system according to Embodiment 3, the second lens unit G2, in order from the object side to the image side, comprises: a bi-concave fourth lens element L4; a bi-concave fifth lens element L5; and a positive meniscus sixth lens element L6 with the convex surface facing the object side. Among these, the fifth lens element L5 and the sixth lens element L6 are cemented with each other.

Further, in the zoom lens system according to Embodiment 3, the third lens unit G3 comprises solely a bi-convex seventh lens element L7. The seventh lens element L7 has an aspheric object side surface.

Further, in the zoom lens system according to Embodiment 3, the fourth lens unit G4, in order from the object side to the image side, comprises: a bi-convex eighth lens element L8; and a negative meniscus ninth lens element L9 with the convex surface facing the object side. Among these, the ninth lens element L9 has two aspheric surfaces.

Further, in the zoom lens system according to Embodiment 3, the fifth lens unit G5, in order from the object side to the image side, comprises: a bi-concave tenth lens element L10; and a positive meniscus eleventh lens element L11 with the convex surface facing the object side. Among these, the eleventh lens element L11 has two aspheric surfaces.

In the zoom lens system according to Embodiment 3, a plane parallel plate P is provided on the object side relative to the image surface S (that is, between the image surface S and the eleventh lens element L11).

In the zoom lens system according to Embodiment 3, in zooming from a wide-angle limit to a telephoto limit at the time of image taking, the second lens unit G2 moves nearly monotonically to the image side, the fourth lens unit G4 moves nearly monotonically to the object side, and the first lens unit G1, the third lens unit G3, and the fifth lens unit G5 are fixed relative to the image surface S. That is, in zooming, the second lens unit G2 and the fourth lens unit G4 individually move along the optical axis such that the interval between the first lens unit G1 and the second lens unit G2 and the interval between the fourth lens unit G4 and the fifth lens unit G5 should increase, and the interval between the second lens unit G2 and the third lens unit G3 and the interval between the third lens unit G3 and the fourth lens unit G4 should decrease.

Figure 10:
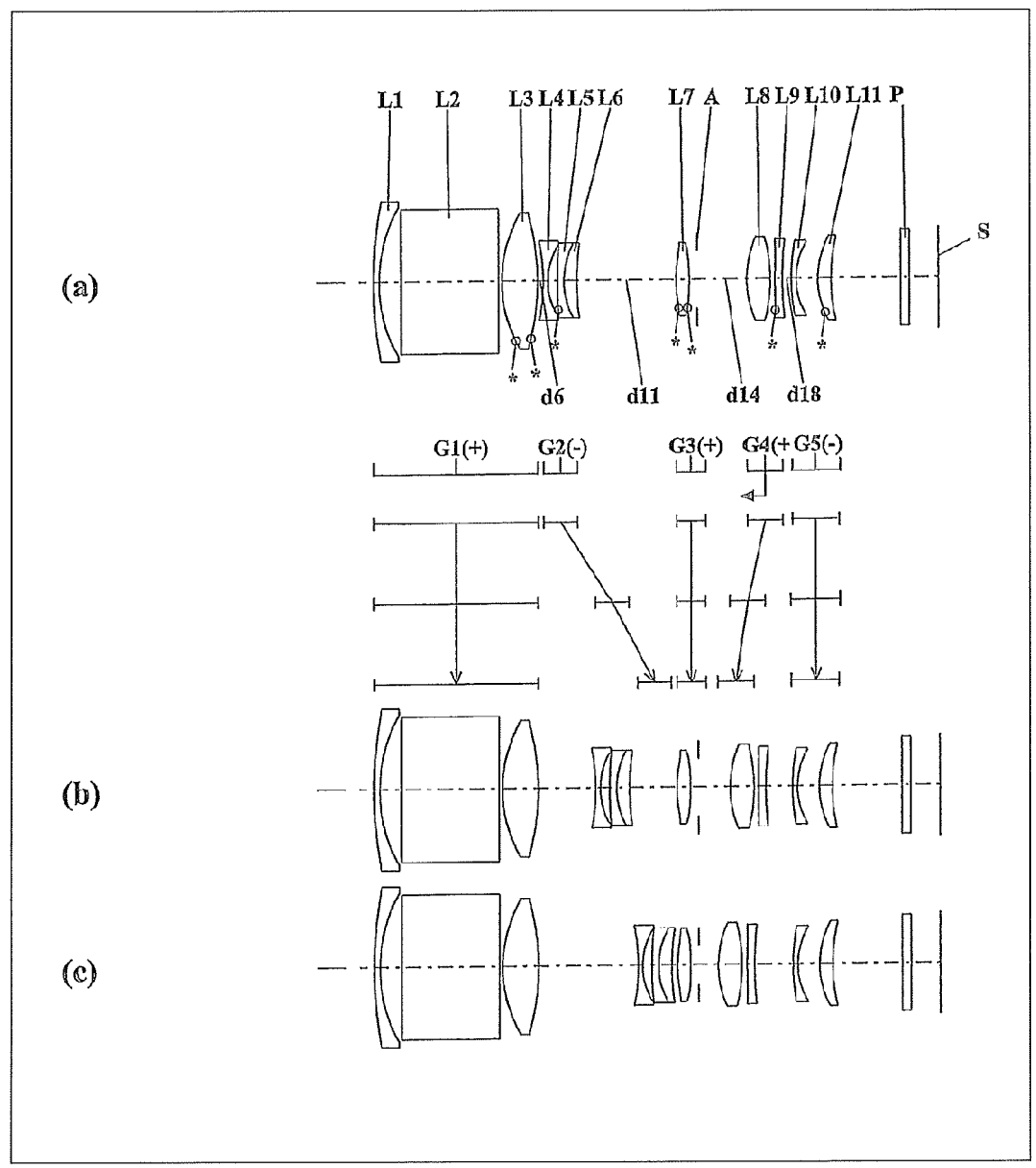
FIG. 10 is a lens arrangement diagram showing an infinity in-focus condition of a zoom lens system according to Embodiment 4 (Example 4)
Figure 11:
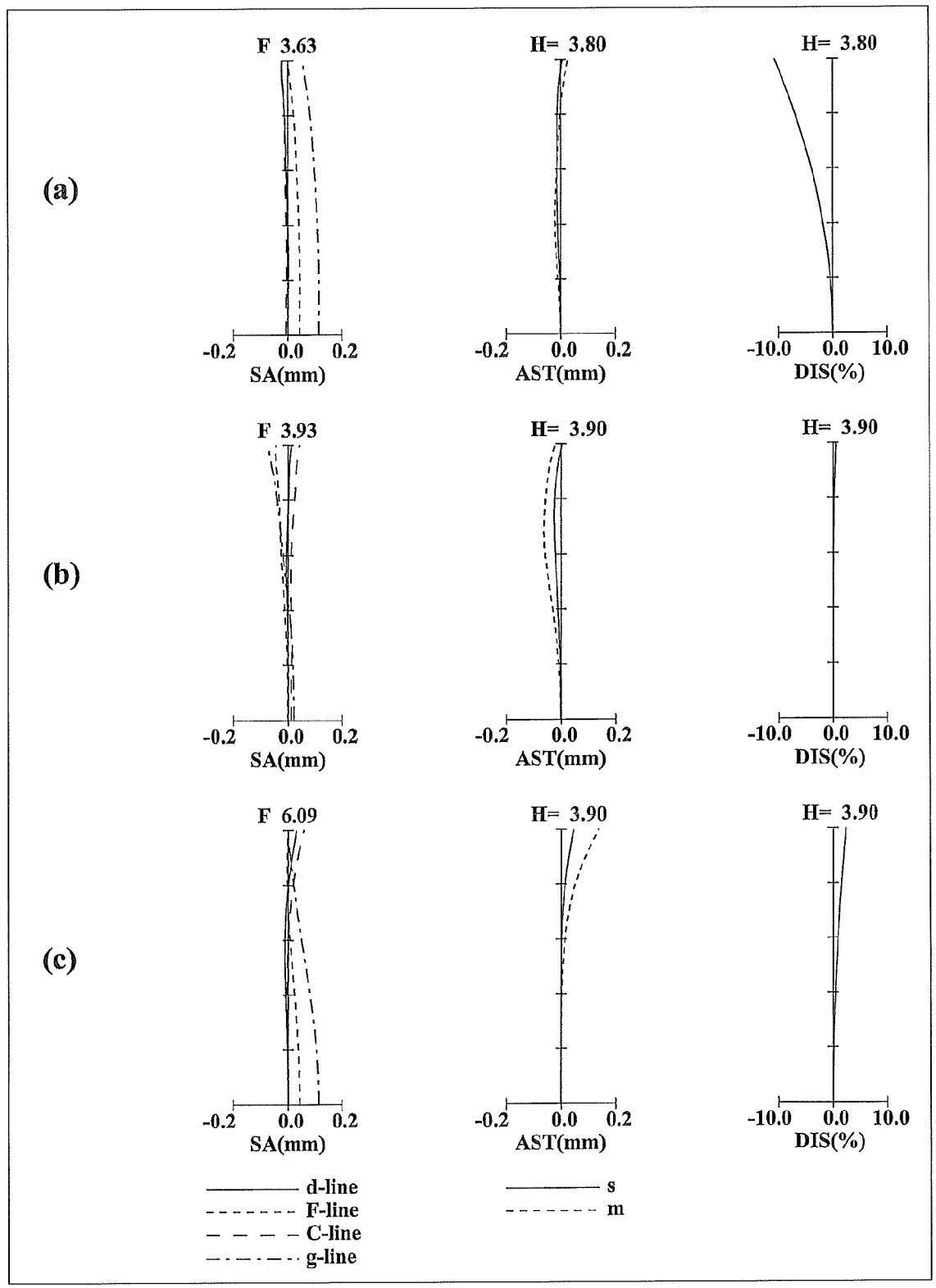
FIG. 11 is a longitudinal aberration diagram of an infinity in-focus condition of a zoom lens system according to Example 4.
Figure 12:
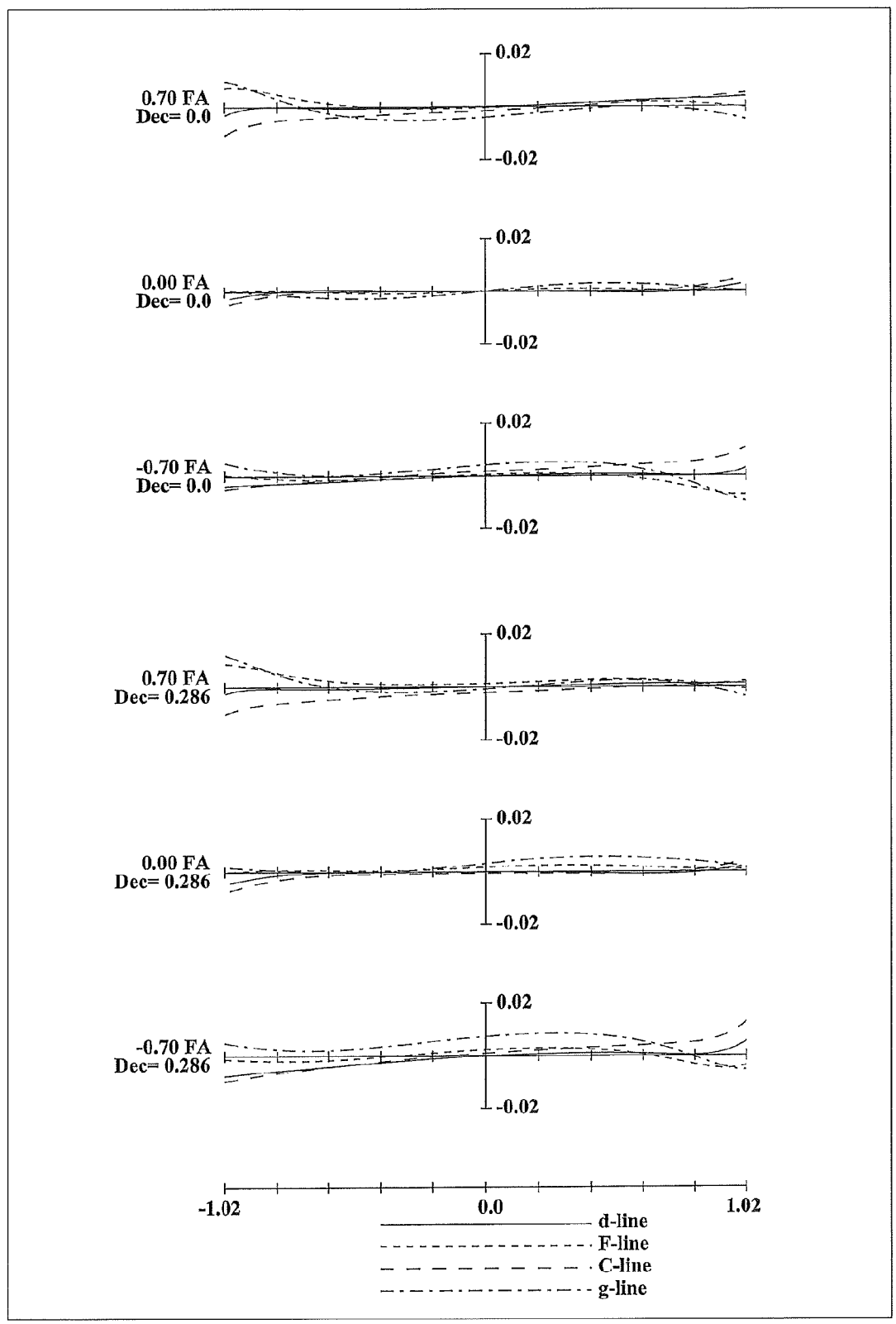
FIG. 12 is a lateral aberration diagram of a zoom lens system according to Example 4 at a telephoto limit in a basic state where image blur compensation is not performed and in a blur compensation state.

As shown in FIG. 10, in the zoom lens system according to Embodiment 4, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; and a bi-convex third lens element L3. Among these, the third lens element L3 has two aspheric surfaces.

In the zoom lens system according to Embodiment 4, the second lens unit G2, in order from the object side to the image side, comprises: a bi-concave fourth lens element L4; a negative meniscus fifth lens element L5 with the convex surface facing the object side; and a positive meniscus sixth lens element L6 with the convex surface facing the object side. Among these, the fifth lens element L5 and the sixth lens element L6 are cemented with each other. Further, the fifth lens element L5 has an aspheric object side surface.

Further, in the zoom lens system according to Embodiment 4, the third lens unit G3 comprises solely a bi-convex seventh lens element L7. The seventh lens element L7 has two aspheric surfaces.

Further, in the zoom lens system according to Embodiment 4, the fourth lens unit G4, in order from the object side to the image side, comprises: a bi-convex eighth lens element L8; and a negative meniscus ninth lens element L9 with the convex surface facing the object side. Among these, the ninth lens element L9 has an aspheric object side surface.

Further, in the zoom lens system according to Embodiment 4, the fifth lens unit G5, in order from the object side to the image side, comprises: a negative meniscus tenth lens element L10 with the convex surface facing the object side; and a positive meniscus eleventh lens element L11 with the convex surface facing the object side. Among these, the eleventh lens element L11 has an aspheric object side surface.

In the zoom lens system according to Embodiment 4, a plane parallel plate P is provided on the object side relative to the image surface S (that is, between the image surface S and the eleventh lens element L11).

In the zoom lens system according to Embodiment 4, in zooming from a wide-angle limit to a telephoto limit at the time of image taking, the second lens unit G2 moves nearly monotonically to the image side, the fourth lens unit G4 moves nearly monotonically to the object side, and the first lens unit G1, the third lens unit G3, and the fifth lens unit G5 are fixed relative to the image surface S. That is, in zooming, the second lens unit G2 and the fourth lens unit G4 individually move along the optical axis such that the interval between the first lens unit G1 and the second lens unit G2 and the interval between the fourth lens unit G4 and the fifth lens unit G5 should increase, and the interval between the second lens unit G2 and the third lens unit G3 and the interval between the third lens unit G3 and the fourth lens unit G4 should decrease.

Figure 13:
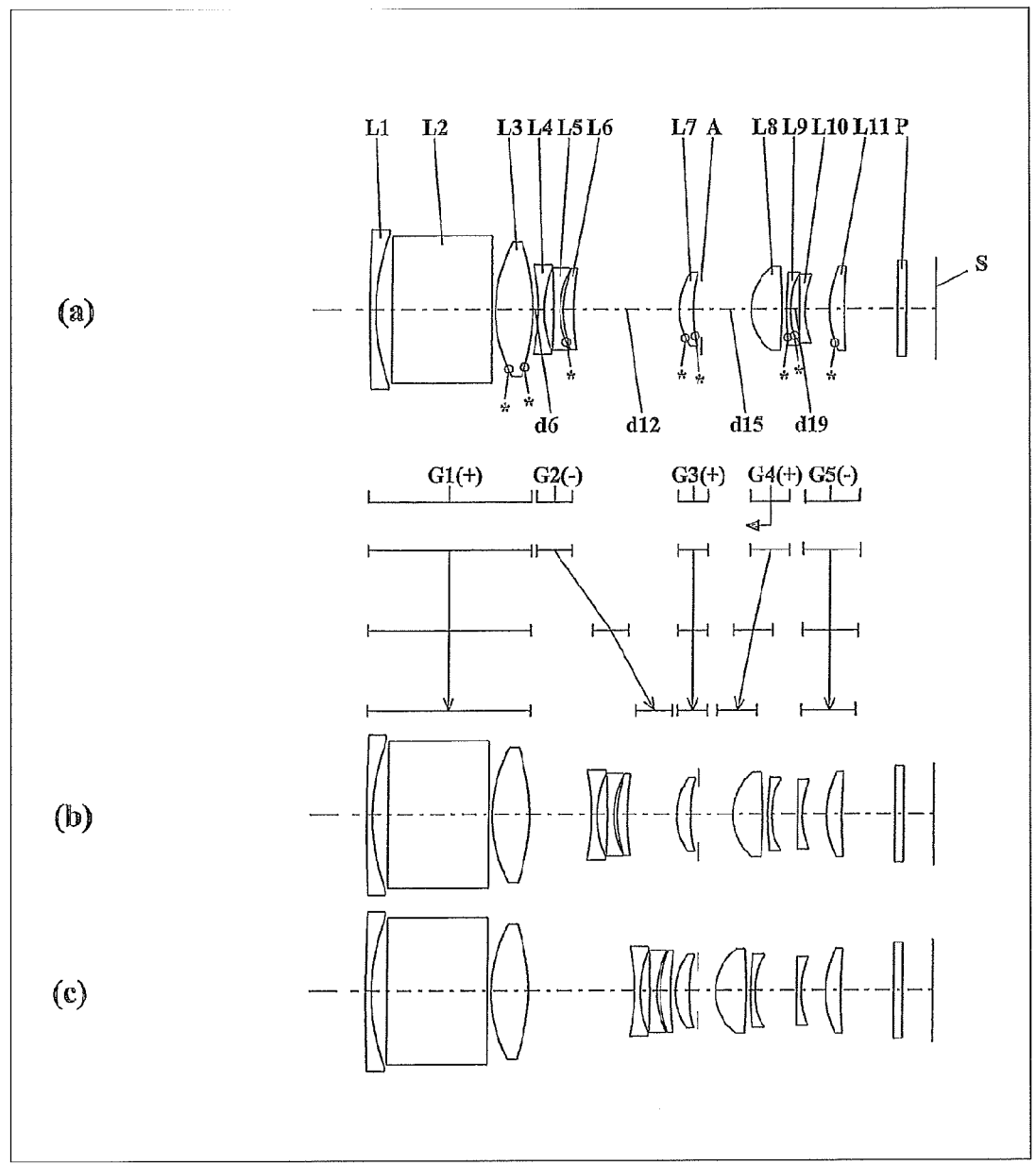
FIG. 13 is a lens arrangement diagram showing an infinity in-focus condition of a zoom lens system according to Embodiment 5 (Example 5)
Figure 14:
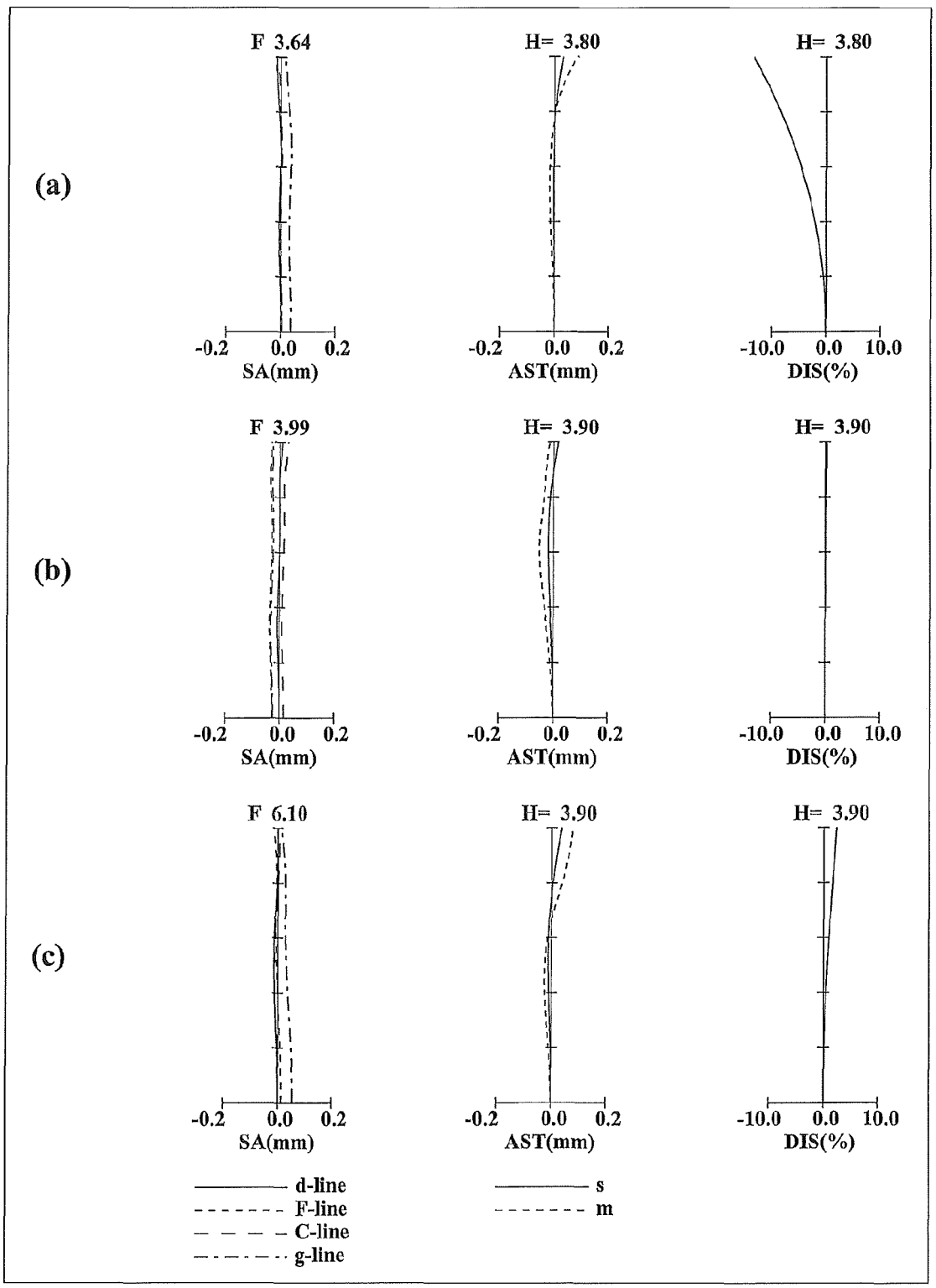
FIG. 14 is a longitudinal aberration diagram of an infinity in-focus condition of a zoom lens system according to Example 5.
Figure 15:
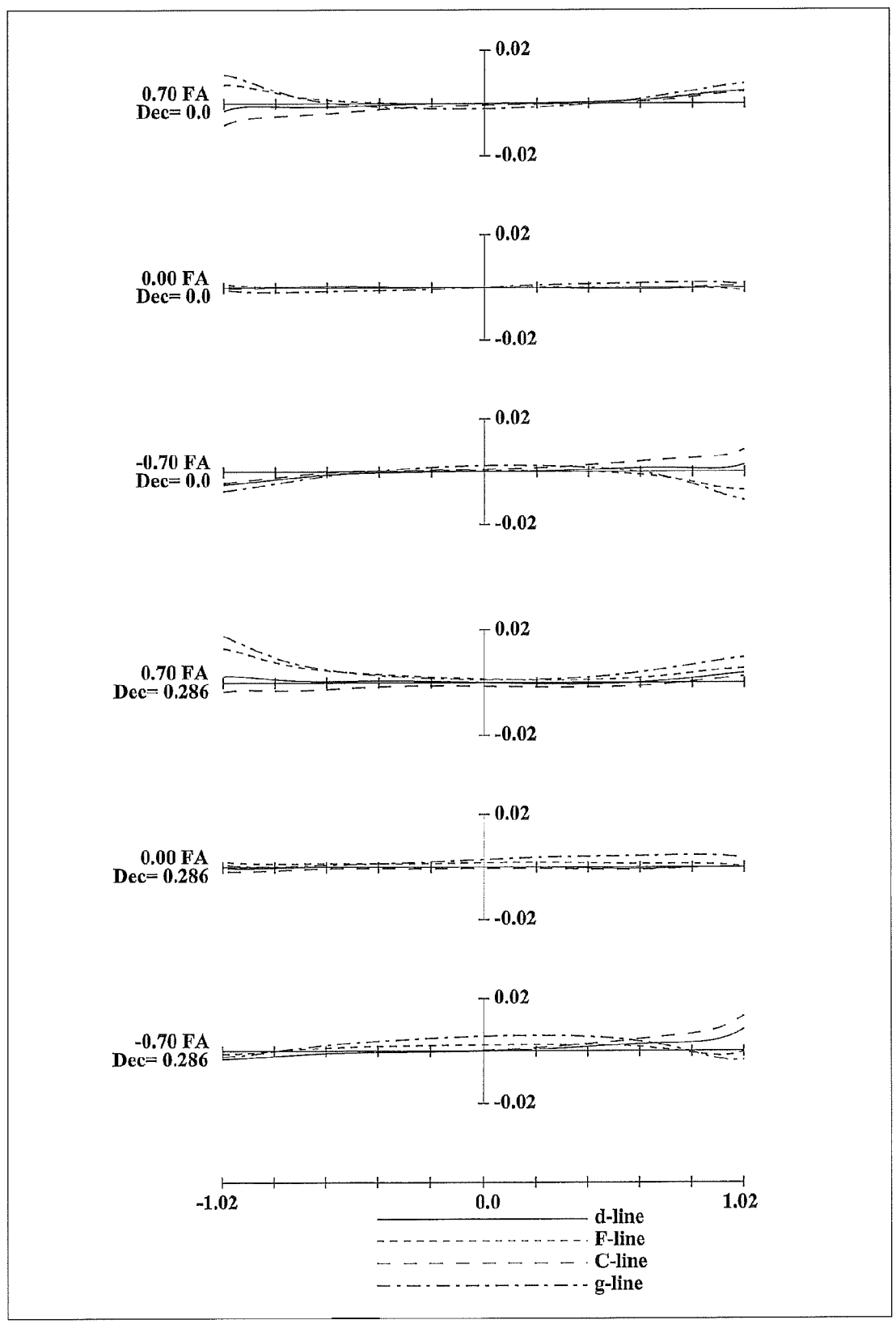
FIG. 15 is a lateral aberration diagram of a zoom lens system according to Example 5 at a telephoto limit in a basic state where image blur compensation is not performed and in a blur compensation state.

As shown in FIG. 13, in the zoom lens system according to Embodiment 5, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; and a bi-convex third lens element L3. Among these, the third lens element L3 has two aspheric surfaces.

In the zoom lens system according to Embodiment 5, the second lens unit G2, in order from the object side to the image side, comprises: a bi-concave fourth lens element L4; a bi-concave fifth lens element L5; and a positive meniscus sixth lens element L6 with the convex surface facing the object side. Among these, the fifth lens element L5 has an aspheric object side surface.

Further, in the zoom lens system according to Embodiment 5, the third lens unit G3 comprises solely a positive meniscus seventh lens element L7 with the convex surface facing the object side. The seventh lens element L7 has two aspheric surfaces.

Further, in the zoom lens system according to Embodiment 5, the fourth lens unit G4, in order from the object side to the image side, comprises: a bi-convex eighth lens element L8; and a negative meniscus ninth lens element L9 with the convex surface facing the object side. Among these, the ninth lens element L9 has two aspheric surfaces.

Further, in the zoom lens system according to Embodiment 5, the fifth lens unit G5, in order from the object side to the image side, comprises: a bi-concave tenth lens element L10; and a positive meniscus eleventh lens element L11 with the convex surface facing the object side. Among these, the eleventh lens element L11 has an aspheric object side surface.

In the zoom lens system according to Embodiment 5, a plane parallel plate P is provided on the object side relative to the image surface S (that is, between the image surface S and the eleventh lens element L11).

In the zoom lens system according to Embodiment 5, in zooming from a wide-angle limit to a telephoto limit at the time of image taking, the second lens unit G2 moves nearly monotonically to the image side, the fourth lens unit G4 moves nearly monotonically to the object side, and the first lens unit G1, the third lens unit G3, and the fifth lens unit G5 are fixed relative to the image surface S. That is, in zooming, the second lens unit G2 and the fourth lens unit G4 individually move along the optical axis such that the interval between the first lens unit G1 and the second lens unit G2 and the interval between the fourth lens unit G4 and the fifth lens unit G5 should increase, and the interval between the second lens unit G2 and the third lens unit G3 and the interval between the third lens unit G3 and the fourth lens unit G4 should decrease.

Figure 16:
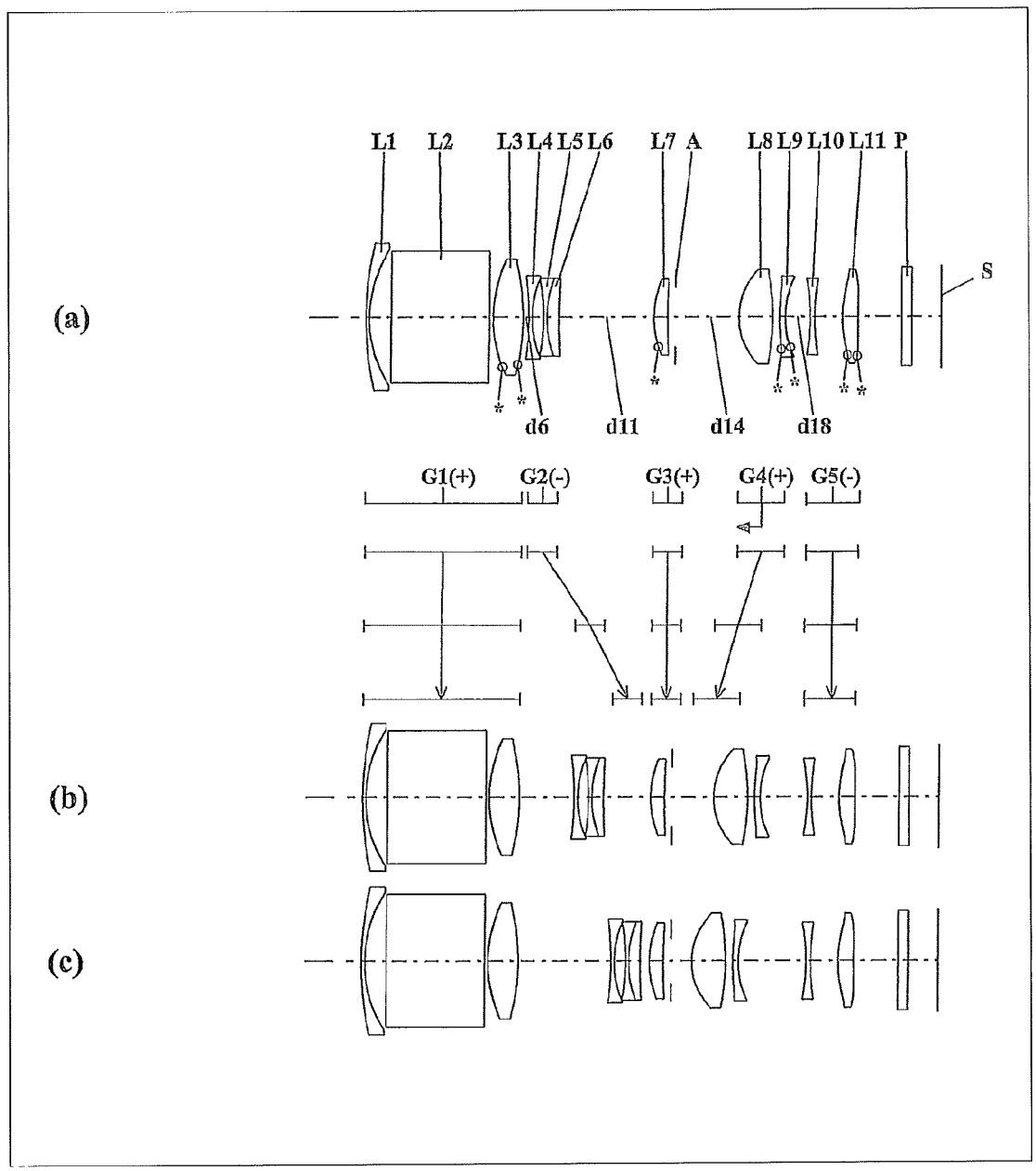
FIG. 16 is a lens arrangement diagram showing an infinity in-focus condition of a zoom lens system according to Embodiment 6 (Example 6)
Figure 17:
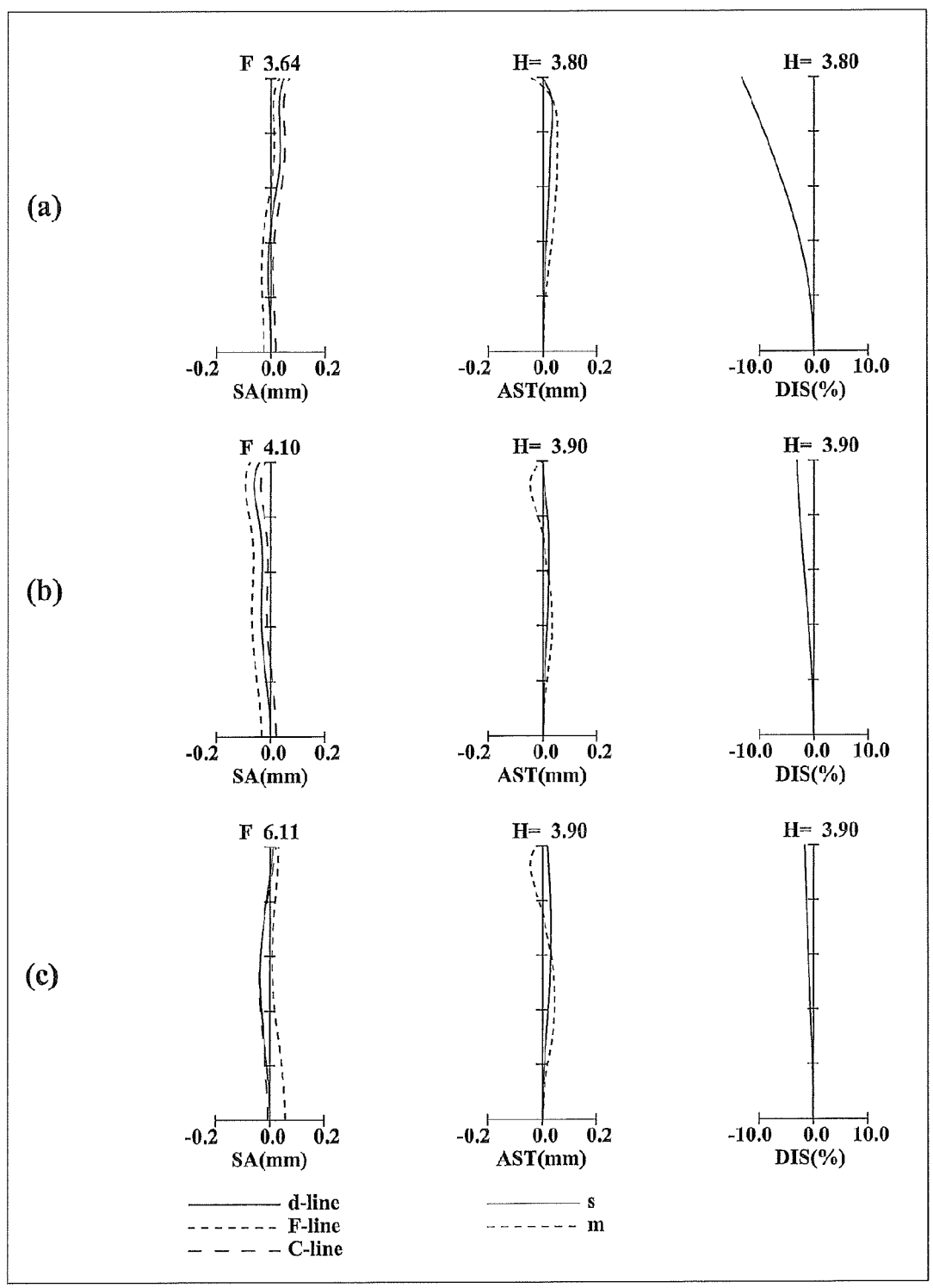
FIG. 17 is a longitudinal aberration diagram of an infinity in-focus condition of a zoom lens system according to Example 6.
Figure 18:
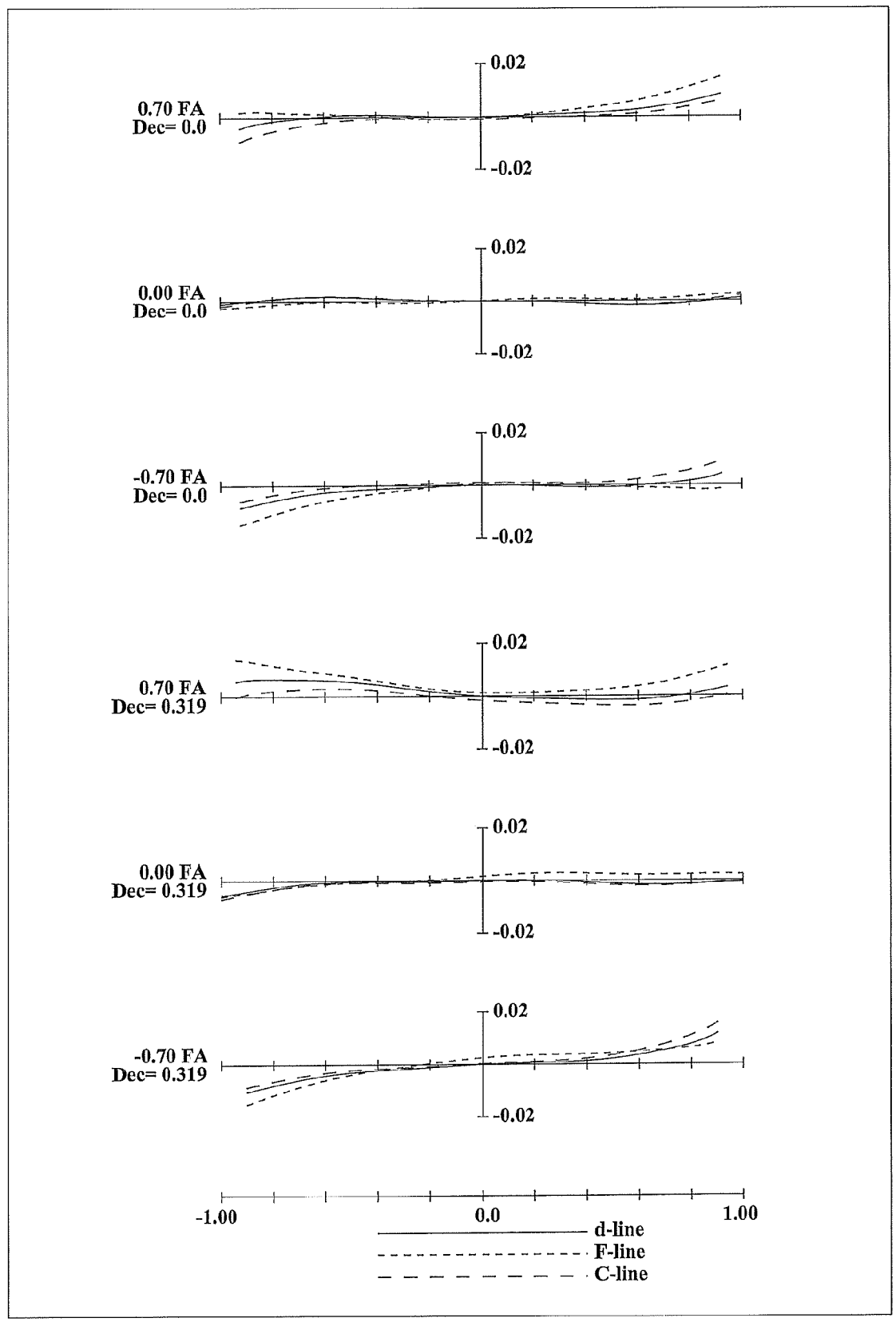
FIG. 18 is a lateral aberration diagram of a zoom lens system according to Example 6 at a telephoto limit in a basic state where image blur compensation is not performed and in a blur compensation state.

As shown in FIG. 16, in the zoom lens system according to Embodiment 6, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; and a bi-convex third lens element L3. Among these, the third lens element L3 has two aspheric surfaces.

In the zoom lens system according to Embodiment 6, the second lens unit G2, in order from the object side to the image side, comprises: a bi-concave fourth lens element L4; a bi-concave fifth lens element L5; and a positive meniscus sixth lens element L6 with the convex surface facing the object side. Among these, the fifth lens element L5 and the sixth lens element L6 are cemented with each other.

Further, in the zoom lens system according to Embodiment 6, the third lens unit G3 comprises solely a positive meniscus seventh lens element L7 with the convex surface facing the object side. The seventh lens element L7 has an aspheric object side surface.

Further, in the zoom lens system according to Embodiment 6, the fourth lens unit G4, in order from the object side to the image side, comprises: a bi-convex eighth lens element L8; and a negative meniscus ninth lens element L9 with the convex surface facing the object side. Among these, the ninth lens element L9 has two aspheric surfaces.

Further, in the zoom lens system according to Embodiment 6, the fifth lens unit G5, in order from the object side to the image side, comprises: a bi-concave tenth lens element L10; and a positive meniscus eleventh lens element L11 with the convex surface facing the object side. Among these, the eleventh lens element L11 has two aspheric surfaces.

In the zoom lens system according to Embodiment 6, a plane parallel plate P is provided on the object side relative to the image surface S (that is, between the image surface S and the eleventh lens element L11).

In the zoom lens system according to Embodiment 6, in zooming from a wide-angle limit to a telephoto limit at the time of image taking, the second lens unit G2 moves nearly monotonically to the image side, the fourth lens unit G4 moves nearly monotonically to the object side, and the first lens unit G1, the third lens unit G3, and the fifth lens unit G5 are fixed relative to the image surface S. That is, in zooming, the second lens unit G2 and the fourth lens unit G4 individually move along the optical axis such that the interval between the first lens unit G1 and the second lens unit G2 and the interval between the fourth lens unit G4 and the fifth lens unit G5 should increase, and the interval between the second lens unit G2 and the third lens unit G3 and the interval between the third lens unit G3 and the fourth lens unit G4 should decrease.

Figure 19:
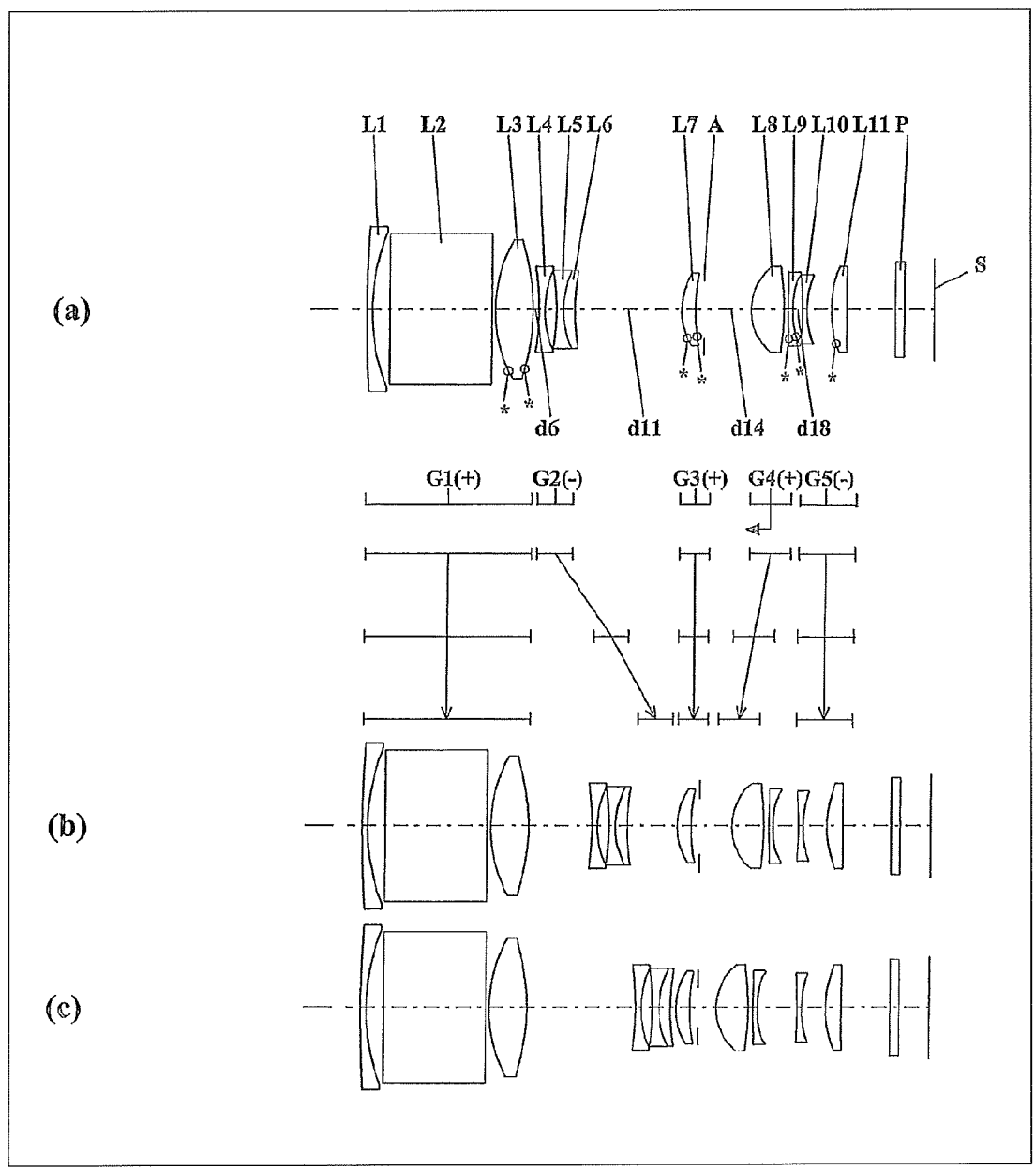
FIG. 19 is a lens arrangement diagram showing an infinity in-focus condition of a zoom lens system according to Embodiment 7 (Example 7)
Figure 20:
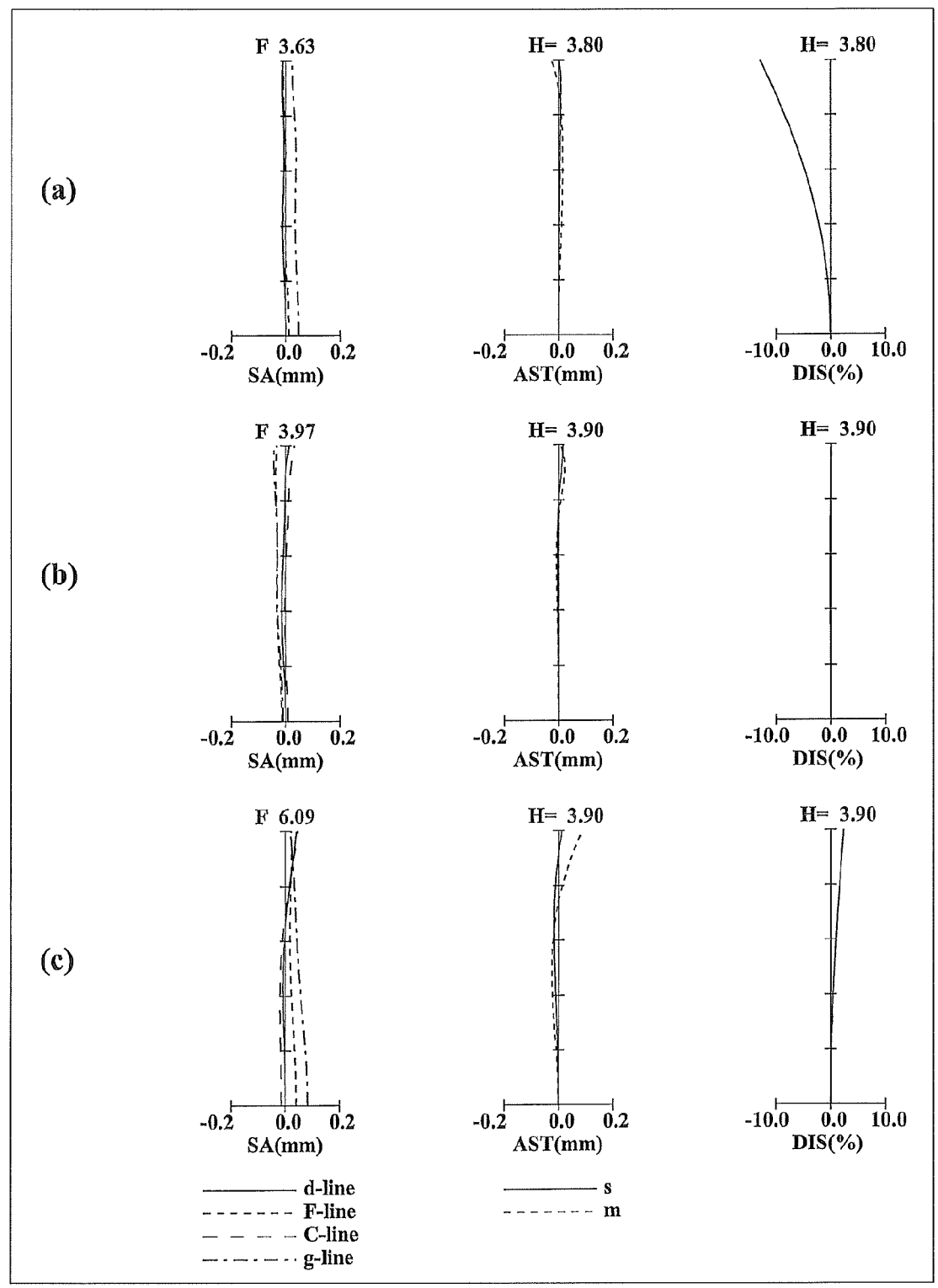
FIG. 20 is a longitudinal aberration diagram of an infinity in-focus condition of a zoom lens system according to Example 7.
Figure 21:
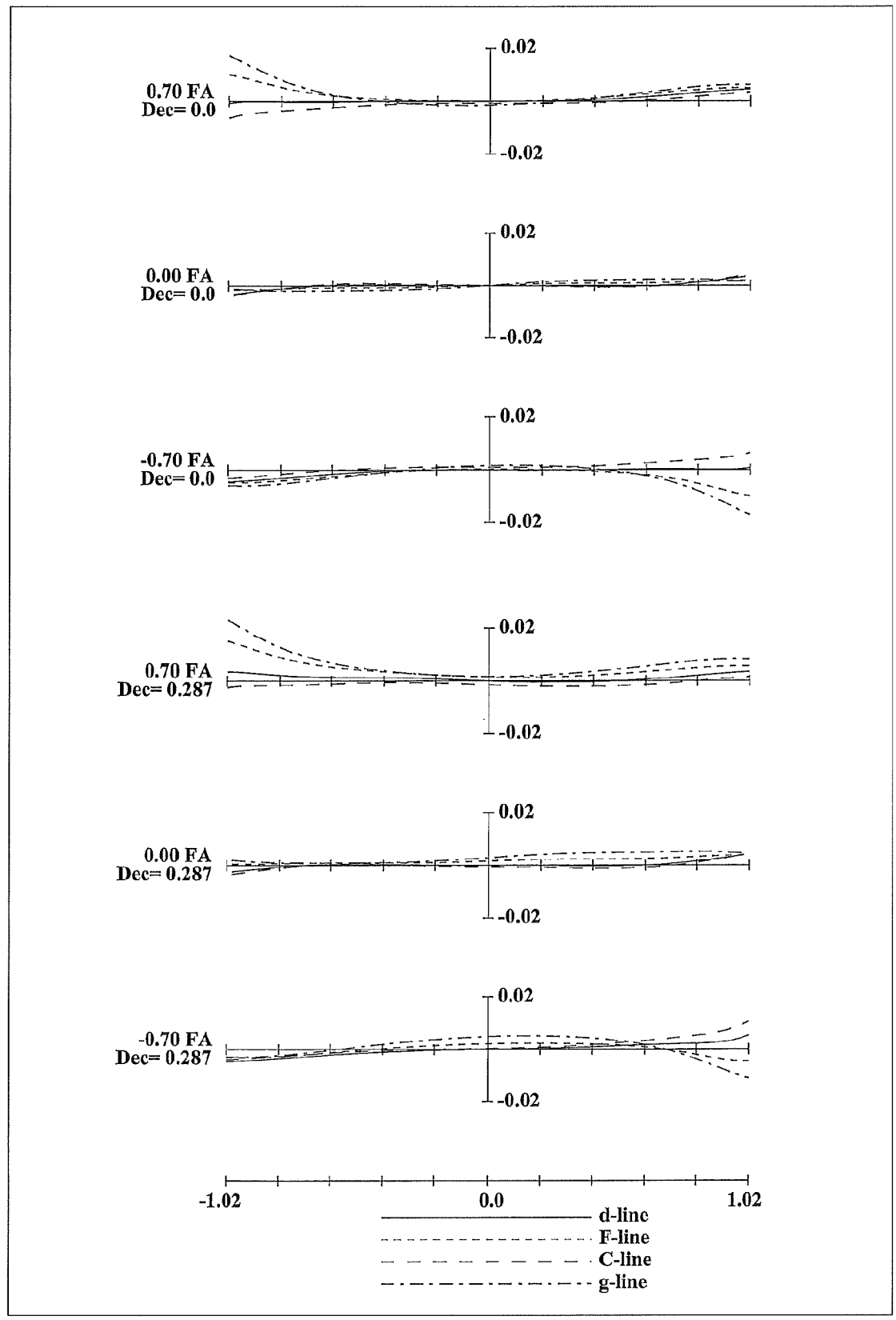
FIG. 21 is a lateral aberration diagram of a zoom lens system according to Example 7 at a telephoto limit in a basic state where image blur compensation is not performed and in a blur compensation state.

As shown in FIG. 19, in the zoom lens system according to Embodiment 7, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; and a bi-convex third lens element L3. Among these, the third lens element L3 has two aspheric surfaces.

In the zoom lens system according to Embodiment 7, the second lens unit G2, in order from the object side to the image side, comprises: a bi-concave fourth lens element L4; a bi-concave fifth lens element L5; and a positive meniscus sixth lens element L6 with the convex surface facing the object side. Among these, the fifth lens element L5 and the sixth lens element L6 are cemented with each other.

Further, in the zoom lens system according to Embodiment 7, the third lens unit G3 comprises solely a positive meniscus seventh lens element L7 with the convex surface facing the object side. The seventh lens element L7 has two aspheric surfaces.

Further, in the zoom lens system according to Embodiment 7, the fourth lens unit G4, in order from the object side to the image side, comprises: a bi-convex eighth lens element L8; and a negative meniscus ninth lens element L9 with the convex surface facing the object side. Among these, the ninth lens element L9 has two aspheric surfaces.

Further, in the zoom lens system according to Embodiment 7, the fifth lens unit G5, in order from the object side to the image side, comprises: a bi-concave tenth lens element L10; and a positive meniscus eleventh lens element L11 with the convex surface facing the object side. Among these, the eleventh lens element L11 has an aspheric object side surface.

In the zoom lens system according to Embodiment 7, a plane parallel plate P is provided on the object side relative to the image surface S (that is, between the image surface S and the eleventh lens element L11).

In the zoom lens system according to Embodiment 7, in zooming from a wide-angle limit to a telephoto limit at the time of image taking, the second lens unit G2 moves nearly monotonically to the image side, the fourth lens unit G4 moves nearly monotonically to the object side, and the first lens unit G1, the third lens unit G3, and the fifth lens unit G5 are fixed relative to the image surface S. That is, in zooming, the second lens unit G2 and the fourth lens unit G4 individually move along the optical axis such that the interval between the first lens unit G1 and the second lens unit G2 and the axial interval between the fourth lens unit G4 and the fifth lens unit G5 should increase, and the interval between the second lens unit G2 and the third lens unit G3 and the interval between the third lens unit G3 and the fourth lens unit G4 should decrease.

Figure 22:
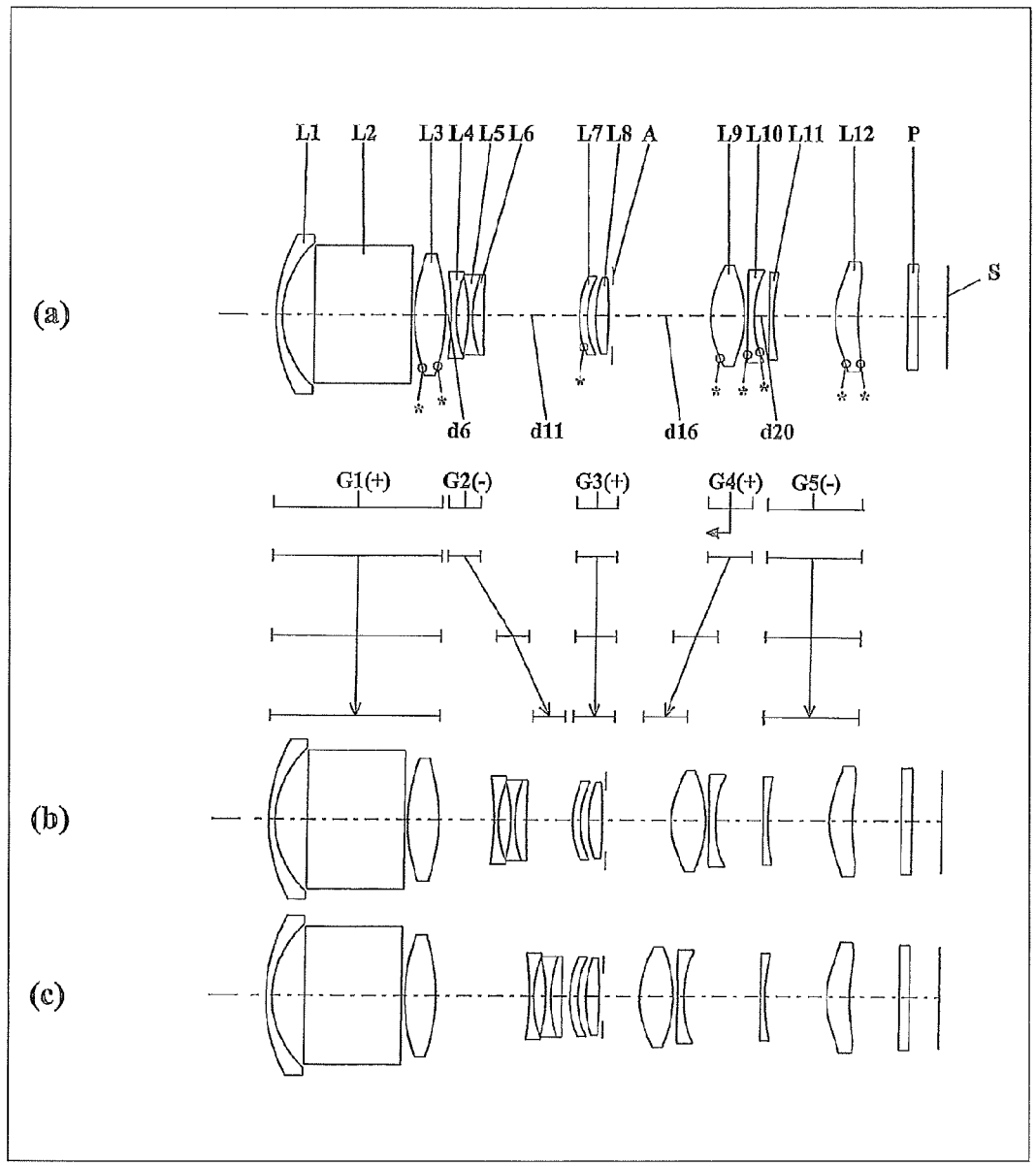
FIG. 22 is a lens arrangement diagram showing an infinity in-focus condition of a zoom lens system according to Embodiment 8 (Example 8)
Figure 23:
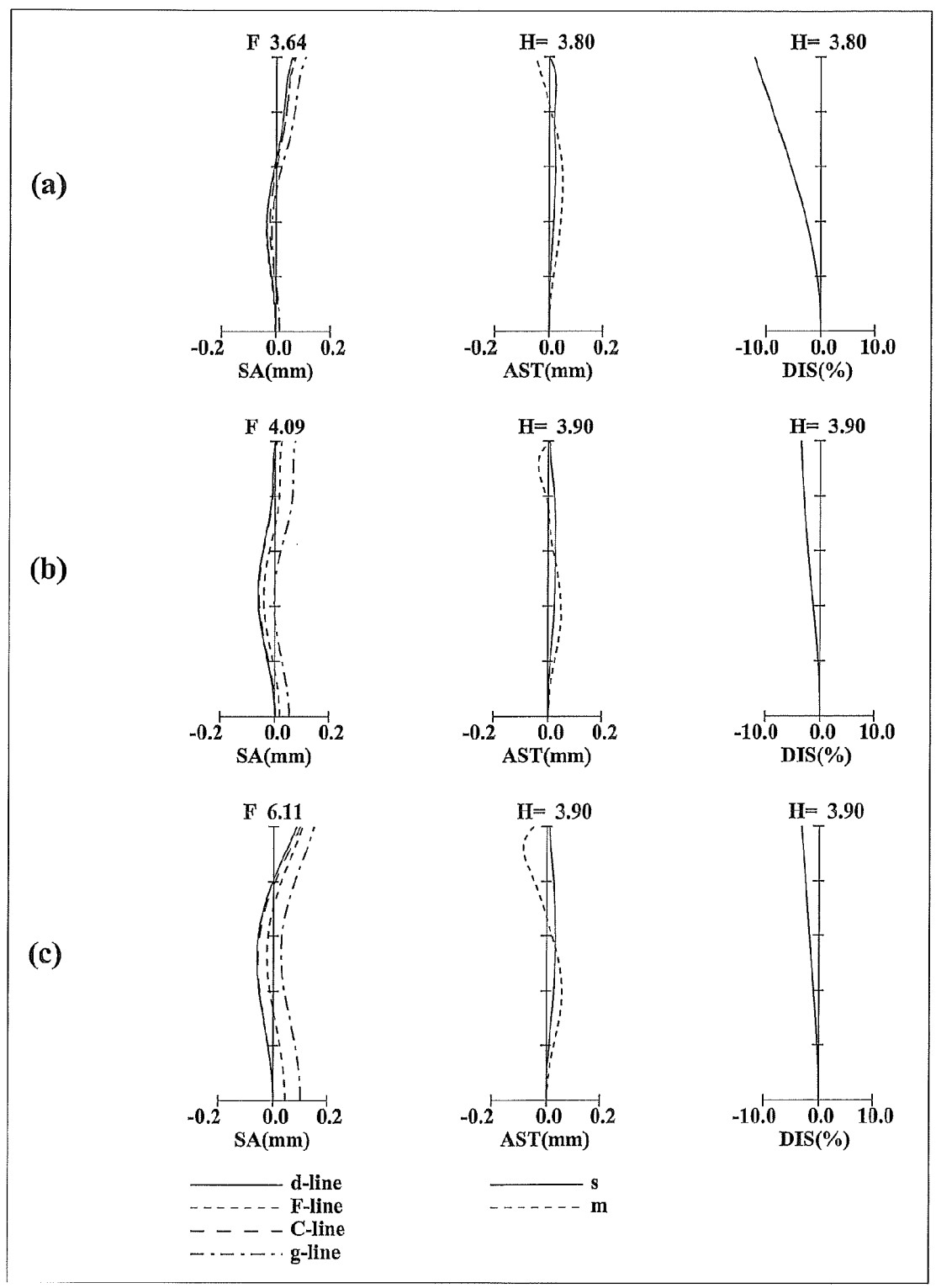
FIG. 23 is a longitudinal aberration diagram of an infinity in-focus condition of a zoom lens system according to Example 8.
Figure 24:
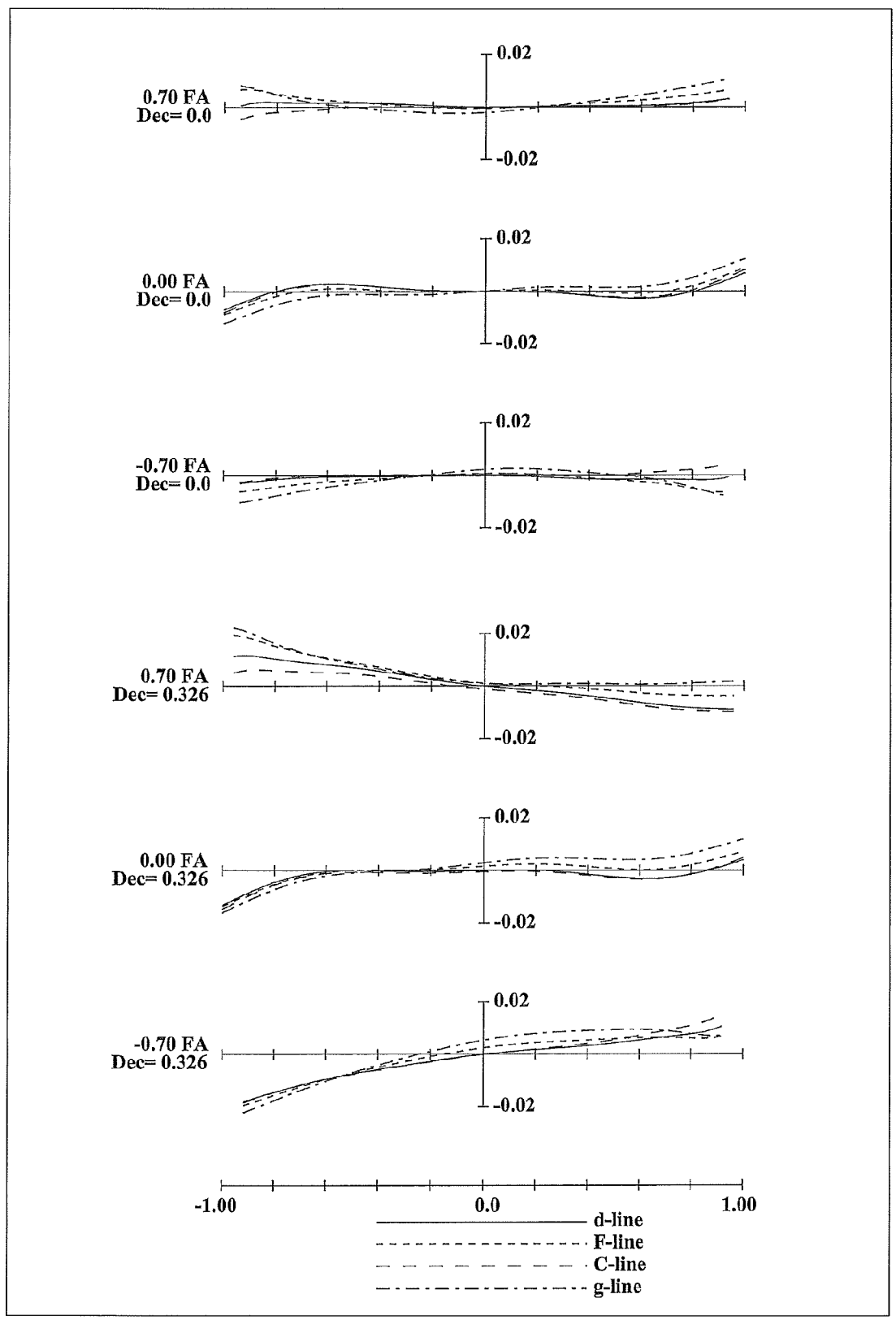
FIG. 24 is a lateral aberration diagram of a zoom lens system according to Example 8 at a telephoto limit in a basic state where image blur compensation is not performed and in a blur compensation state.

As shown in FIG. 22, in the zoom lens system according to Embodiment 8, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; and a bi-convex third lens element L3. Among these, the third lens element L3 has two aspheric surfaces.

In the zoom lens system according to Embodiment 8, the second lens unit G2, in order from the object side to the image side, comprises: a bi-concave fourth lens element L4; a bi-concave fifth lens element L5; and a positive meniscus sixth lens element L6 with the convex surface facing the object side. Among these, the fifth lens element L5 and the sixth lens element L6 are cemented with each other.

Further, in the zoom lens system according to Embodiment 8, the third lens unit G3, in order from the object side to the image side, comprises: a negative meniscus seventh lens element L7 with the convex surface facing the object side; and a bi-convex eighth lens element L8. Among these, the seventh lens element L7 has an aspheric object side surface.

Further, in the zoom lens system according to Embodiment 8, the fourth lens unit G4, in order from the object side to the image side, comprises: a bi-convex ninth lens element L9; and a negative meniscus tenth lens element L10 with the convex surface facing the object side. Among these, the ninth lens element L9 has an aspheric object side surface. The tenth lens element L10 has two aspheric surfaces.

Further, in the zoom lens system according to Embodiment 8, the fifth lens unit G5, in order from the object side to the image side, comprises: a plano-concave eleventh lens element L11 with the concave surface facing the image side; and a positive meniscus twelfth lens element L12 with the convex surface facing the object side. Among these, the twelfth lens element L12 has two aspheric surfaces.

In the zoom lens system according to Embodiment 8, a plane parallel plate P is provided on the object side relative to the image surface S (that is, between the image surface S and the twelfth lens element L12).

In the zoom lens system according to Embodiment 8, in zooming from a wide-angle limit to a telephoto limit at the time of image taking, the second lens unit G2 moves nearly monotonically to the image side, the fourth lens unit G4 moves nearly monotonically to the object side, and the first lens unit G1, the third lens unit G3, and the fifth lens unit G5 are fixed relative to the image surface S. That is, in zooming, the second lens unit G2 and the fourth lens unit G4 individually move along the optical axis such that the interval between the first lens unit G1 and the second lens unit G2 and the interval between the fourth lens unit G4 and the fifth lens unit G5 should increase, and the interval between the second lens unit G2 and the third lens unit G3 and the interval between the third lens unit G3 and the fourth lens unit G4 should decrease.

The zoom lens systems according to Embodiments 1 to 8 are each composed of 11 or 12 lens elements. Thus, each zoom lens system has a very short overall length of lens system while having a relatively high zooming ratio exceeding, for example, 3.5 as described later.

In the zoom lens system according to Embodiments 1 to 8, the first lens unit G1 includes the second lens element L2 (prism) having a reflecting surface capable of bending the light beam incident from the object, that is, bending the axial principal ray incident from the object at approximately 90°. Thus, the zoom lens system is constructed such that the thickness thereof in the direction of the optical axis of the axial light beam incident from the object is reduced in an image taking state.

In the zoom lens system according to Embodiments 1 to 8, in zooming from a wide-angle limit to a telephoto limit at the time of image taking, the first lens unit G1 does not move along the optical axis. Thus, as a lens barrel for holding this zoom lens system, a lens barrel without a shape change associated with zooming can be employed. This permits fabrication of a camera having a high degree of freedom in the shape as well as an excellent shock resistance.

In the zoom lens system according to Embodiments 1 to 8, in zooming from a wide-angle limit to a telephoto limit at the time of image taking, the third lens unit G3 and the fifth lens unit G5 do not move along the optical axis. Thus, the zoom lens system has a small number of movable lens units, and thereby the construction of the lens barrel is simplified.

In the zoom lens system according to Embodiments 1 to 8, the fourth lens unit G4, in order from the object side to the image side, comprises: a lens element having positive optical power and a lens element having negative optical power, and the lens element having positive optical power and the lens element having negative optical power are arranged with an air space therebetween. Thus, the degree of freedom in constituting the fourth lens unit G4 is high, and thereby the aberration compensating ability of the fourth lens unit G4 is enhanced.

In the zoom lens system according to Embodiments 1 to 8, the aperture diaphragm A is arranged between the third lens unit G3 and the fourth lens unit G4. Thus, the amount of movement of the second lens unit G2 is increased as compared with the case where the aperture diaphragm A is arranged between the second lens unit G2 and the third lens unit G3. This arrangement of the aperture diaphragm A is particularly effective in compensating curvature of field at a wide-angle limit.

Although the zoom lens systems according to Embodiments 1 to 8 each have a five-unit construction consisting of the first lens unit G1 to the fifth lens unit G5, the number of lens units constructing the zoom lens system is not particularly limited.

In the zoom lens system according to Embodiments 1 to 8, the fourth lens unit G4 has positive optical power and the fifth lens unit G5 has negative optical power. However, the optical powers of these lens units that are subsequent to the third lens unit G3 are not particularly limited. The zoom lens systems may be constructed such that the fourth lens unit G4 has positive optical power and the fifth lens unit G5 has positive optical power, or the fourth lens unit G4 has negative optical power and the fifth lens unit G5 has positive optical power, or the fourth lens unit G4 has negative optical power and the fifth lens unit G5 has negative optical power In the zoom lens system according to Embodiments 1 to 8, the entirety of any lens unit among the first lens unit G1, the second lens unit G2, the third lens unit G3, the fourth lens unit G4, and the fifth lens unit G5, or a sub lens unit consisting of a part of a lens unit may be moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the lens elements constituting the fifth lens unit G5 are moved in a direction perpendicular to the optical axis, so that image blur is compensated in a state that size increase in the entire zoom lens system is suppressed and a compact construction is realized and that excellent imaging characteristics such as small decentering coma aberration and small decentering astigmatism are satisfied.

In a case that a lens unit is composed of a plurality of lens elements, the above-mentioned sub lens unit consisting of a part of a lens unit indicates any one lens element or a plurality of adjacent lens elements among the plurality of lens elements.

Conditions preferably to be satisfied by a zoom lens system like the zoom lens systems according to Embodiments 1 to 8 are described below. Here, a plurality of preferable conditions are set forth for the zoom lens system according to each embodiment. A construction that satisfies all the plurality of conditions is most desirable for the zoom lens system. However, when an individual condition is satisfied, a zoom lens system having the corresponding effect can be obtained.

In a zoom lens system like the zoom lens systems according to Embodiments 1 to 6, in order from the object side to the image side, comprising a first lens unit having positive optical power, a second lens unit having negative optical power, a third lens unit having positive optical power, and subsequent lens units including a fourth lens unit having optical power, wherein any one of the first lens unit, the second lens unit, the third lens unit, and the subsequent lens units includes a lens element having a reflecting surface that bends the light beam incident from the object, and, in zooming from a wide-angle limit to a telephoto limit at the time of image taking, the first lens unit and the third lens unit do not move along the optical axis (this lens configuration is referred to as basic configuration I of the embodiment, hereinafter), the following condition (1) is satisfied.

$$1.42 < nd_{4ave} < 1.58 \tag{1}$$

where, $nd_{4ave}$ is an average of refractive indices to the d-line of the lens elements constituting the fourth lens unit.

The condition (1) sets forth the refractive indices to the d-line of the lens elements constituting the fourth lens unit, and the average of the refractive indices of all the lens elements constituting the fourth lens unit satisfies the condition (1). When the value goes below the lower limit of the condition (1), the curvature radius becomes excessively small due to the low refractive index, which causes a difficulty in controlling variation in spherical aberration that is mainly caused by zooming. In contrast, when the value exceeds the upper limit of the condition (1), it becomes difficult to control variation in curvature of field that is caused by zooming. Moreover, deterioration of optical performance due to an error in the surface shape becomes severe.

When at least one of the following conditions (1)' and (1)" is satisfied, the above-mentioned effect is achieved more successfully.

$$1.50 < nd_{4ave} \tag{1)'}$$

$$nd_{4ave} < 1.57 \tag{1)"}$$

In a zoom lens system having basic configuration I like the zoom lens systems according to Embodiments 1 to 6, at least one of all the lens elements constituting the fourth lens unit satisfies the following conditions (2-1) and (2-2), simultaneously.

$$1.42 < nd_4 < 1.66 \tag{2-1}$$

$$15 < vd_4 < 36 \tag{2-2}$$

where, $nd_4$ is a refractive index to the d-line of any of the lens elements constituting the fourth lens unit, and $vd_4$ is an Abbe number to the d-line of any of the lens elements constituting the fourth lens unit.

The condition (2-1) sets forth the refractive index to the d-line of any of the lens elements constituting the fourth lens unit, and at least one of all the lens elements constituting the fourth lens unit satisfies the condition (2-1). When the value goes below the lower limit of the condition (2-1), the curvature radius becomes excessively small due to the low refractive index, which causes a difficulty in controlling spherical aberration mainly at a telephoto limit. In contrast, when the value exceeds the upper limit of the condition (2-1), it becomes difficult to control variation in axial chromatic aberration that is caused by zooming. Moreover, deterioration of optical performance due to an error in the surface shape becomes severe.

When at least one of the following conditions (2-1)' and (2-1)" is satisfied, the above-mentioned effect is achieved more successfully.

$$1.55 < nd_4 \tag{2-1)'}$$

$$nd_4 < 1.64 \tag{2-1)"}$$

The condition (2-2) sets forth the Abbe number to the d-line of any of the lens elements constituting the fourth lens unit, and at least one of all the lens elements constituting the fourth lens unit satisfies the condition (2-2). When the value goes below the lower limit of the condition (2-2), it becomes difficult to control magnification chromatic aberration at a wide-angle limit. Moreover, it becomes difficult to control magnification chromatic aberration at a telephoto limit at the time of close-up shooting. In contrast, when the value exceeds the upper limit of the condition (2-2), chromatic aberration that occurs in the fourth lens unit cannot be sufficiently reduced, which causes a difficulty in controlling variation in axial chromatic aberration that is caused by zooming.

When at least one of the following conditions (2-2)' and (2-2)" is satisfied, the above-mentioned effect is achieved more successfully.

$$22 < vd_4 \quad (2\text{-}2)'$$

$$vd_4 < 32 \quad (2\text{-}2)''$$

In a zoom lens system like the zoom lens systems according to Embodiments 3 to 5, 7, and 8, in order from the object side to the image side, comprising a first lens unit having positive optical power, a second lens unit having negative optical power, a third lens unit having positive optical power, a fourth lens unit having optical power, and a fifth lens unit having optical power, wherein any one of the first lens unit, the second lens unit, the third lens unit, the fourth lens unit, and the fifth lens unit includes a lens element having a reflecting surface that bends the light beam incident from the object, and, in zooming from a wide-angle limit to a telephoto limit at the time of image taking, the first lens unit, the third lens unit, and the fifth lens unit do not move along the optical axis, and the aperture diaphragm is arranged between the third lens unit and the fourth lens unit (this lens configuration is referred to as basic configuration II of the embodiment, hereinafter), at least two of all the lens elements constituting the lens system satisfy the following conditions (3-1) and (4-1), simultaneously.

$$vd < 59 \quad (3\text{-}1)$$

$$\left.\begin{array}{l} \text{when } vd < 34 \\ 0.000 < PgF + 0.0038 \times vd - 0.725 \\ \text{when } 34 \le vd < 59 \\ 0.000 < PgF + 0.0020 \times vd - 0.664 \end{array}\right\} \quad (4\text{-}1)$$

where, vd is an Abbe number to the d-line of any of the lens elements constituting the lens system, PgF is a partial dispersion ratio of any of the lens elements constituting the lens system, which is represented by the following equation:

$$PgF = (ng - nF)/(nF - nC),$$

ng is a refractive index to the g-line,
nF is a refractive index to the F-line, and
nC is a refractive index to the C-line.

The condition (3-1) sets forth the Abbe number to the d-line of any of the lens elements constituting the lens system, and at least two of all the lens elements constituting the lens system satisfy the condition (3-1). When the value exceeds the upper limit of the condition (3-1), it becomes difficult to control variation in axial chromatic aberration that is caused by zooming.

When the following condition (3-1)' is satisfied, the above-mentioned effect is achieved more successfully.

$$vd < 57 \quad (3\text{-}1)'$$

The condition (4-1) sets forth abnormal dispersion, based on the Abbe number, of any of the lens elements constituting the lens system, and at least two of all the lens elements constituting the lens system satisfy the condition (4-1). When the value goes below the lower limit of the condition (4-1), it becomes difficult to control the balance between the secondary spectrum and the monochromatic aberration in the entire zooming area.

When the following condition (4-1)' is satisfied, the above-mentioned effect is achieved more successfully.

$$\left.\begin{array}{l} \text{when } vd < 34 \\ 0.005 < PgF + 0.0038 \times vd - 0.725 \\ \text{when } 34 \le vd < 59 \\ 0.005 < PgF + 0.0020 \times vd - 0.664 \end{array}\right\} \quad (4\text{-}1)'$$

In a zoom lens system having basic configuration II like the zoom lens systems according to Embodiments 3 to 5, 7, and 8, at least one of all the lens elements constituting the third lens unit satisfies the following conditions (3-2) and (4-2), simultaneously.

$$vd_3 < 59 \quad (3\text{-}2)$$

$$\left.\begin{array}{l} \text{when } vd_3 < 34 \\ 0.000 < PgF_3 + 0.0038 \times vd_3 - 0.725 \\ \text{when } 34 \le vd_3 < 59 \\ 0.000 < PgF_3 + 0.0020 \times vd_3 - 0.664 \end{array}\right\} \quad (4\text{-}2)$$

where, $vd_3$ is an Abbe number to the d-line of any of the lens elements constituting the third lens unit, $PgF_3$ is a partial dispersion ratio of any of the lens elements constituting the third lens unit, which is represented by the following equation:

$$PgF_3 = (ng - nF)/(nF - nC),$$

ng is a refractive index to the g-line,
nF is a refractive index to the F-line, and
nC is a refractive index to the C-line.

The condition (3-2) sets forth the Abbe number to the d-line of any of the lens elements constituting the third lens unit, and at least one of all the lens elements constituting the third lens unit satisfies the condition (3-2). When the value exceeds the upper limit of the condition (3-2), it becomes difficult to control variation in axial chromatic aberration that is caused by zooming When the following condition (3-2)' is satisfied, the above-mentioned effect is achieved more successfully.

$$vd_3 < 57 \quad (3\text{-}2)'$$

The condition (4-2) sets forth abnormal dispersion, based on the Abbe number, of any of the lens elements constituting the third lens unit, and at least one of all the lens elements constituting the third lens unit satisfies the condition (4-2). When the value goes below the lower limit of the condition (4-2), it becomes difficult to control the balance between the secondary spectrum and the monochromatic aberration that occur at a telephoto limit.

When the following condition (4-2)' is satisfied, the above-mentioned effect is achieved more successfully.

$$\left.\begin{array}{l} \text{when } vd_3 < 34 \\ 0.005 < PgF_3 + 0.0038 \times vd_3 - 0.725 \\ \text{when } 34 \le vd_3 < 59 \\ 0.005 < PgF_3 + 0.0020 \times vd_3 - 0.664 \end{array}\right\} \quad (4\text{-}2)'$$

In a zoom lens system having at least one of basic configurations I and II like the zoom lens systems according to Embodiments 1 to 8, it is preferred that the following conditions (5) and (a) are satisfied.

$$2.0 < f_W/t_{G2} < 7.0 \quad (5)$$

$$f_T/f_W > 2.5 \quad (a)$$

where, $t_{G2}$ is a thickness of the second lens unit (a distance on the optical axis from the object side surface of the most object side lens element to the image side surface of the most image side lens element), $f_T$ is a focal length of the entire system at a telephoto limit, and $f_W$ is a focal length of the entire system at a wide-angle limit.

The condition (5) sets forth an axial thickness of the second lens unit. When the value goes below the lower limit of the condition (5), it might be difficult to control distortion at a wide-angle limit. In contrast, when the value exceeds the upper limit of the condition (5), the diameter of the first lens unit is increased, which might cause a difficulty in achieving size reduction. Moreover, the thickness of each lens element is excessively reduced, which might cause a difficulty in manufacturing each lens element.

More preferably, the condition (5) is satisfied under the following condition (a)'.

$$f_T/f_W > 3.6 \quad (a)'$$

In a zoom lens system having at least one of basic configurations I and II like the zoom lens systems according to Embodiments 1 to 8, it is preferred that at least one of all the lens elements constituting the fourth lens unit satisfies the following condition (6). When a zoom lens system having basic configuration I like the zoom lens systems according to Embodiments 1 to 6 satisfies the condition (2-2), it is preferred that at least one of the lens elements that do not satisfy the condition (2-2), among all the lens elements constituting the fourth lens unit, satisfies the following condition (6).

$$70 < vd_4 \quad (6)$$

where, $vd_4$ is an Abbe number to the d-line of any of the lens elements constituting the fourth lens unit.

The condition (6) sets forth the Abbe number to the d-line of any of the lens elements constituting the fourth lens unit, and it is preferred that at least one of all the lens elements constituting the fourth lens unit satisfies the condition (6). In a case where the zoom lens system having base configuration I satisfies the condition (2-2), it is preferred that at least one of the lens elements that do not satisfy the condition (2-2), among all the lens elements constituting the fourth lens unit, satisfies the condition (6). When the value goes below the lower limit of the condition (6), it might be difficult to control variation in axial chromatic aberration that is caused by zooming.

When the following condition (6)' is satisfied, the above-mentioned effect is achieved more successfully.

$$80 < vd_4 \quad (6)'$$

In a zoom lens system having at least one of basic configurations I and II like the zoom lens systems according to Embodiments 1 to 8, it is preferred that the following conditions (7) and (a) are satisfied.

$$-0.65 < f_{G2}/f_{G4} < -0.35 \quad (7)$$

$$f_T/f_W > 2.5 \quad (a)$$

where, $f_{G2}$ is a composite focal length of the second lens unit, $f_{G4}$ is a composite focal length of the fourth lens unit, $f_T$ is a focal length of the entire system at a telephoto limit, and $f_W$ is a focal length of the entire system at a wide-angle limit.

The condition (7) sets forth appropriate focal lengths of the second lens unit and the fourth lens unit. When the value goes below the lower limit of the condition (7), contribution of the fourth lens unit to aberration compensation becomes excessively large, which might cause a difficulty in controlling variation in spherical aberration that is caused by zooming. In contrast, when the value exceeds the upper limit of the condition (7), contribution of the second lens unit to aberration compensation becomes excessively large, which might cause a difficulty in controlling astigmatism and distortion at a wide-angle limit.

When at least one of the following conditions (7)' and (7)" is satisfied, the above-mentioned effect is achieved more successfully.

$$-0.50 < f_{G2}/f_{G4} \quad (7)'$$

$$f_{G2}/f_{G4} < -0.40 \quad (7)''$$

More preferably, the conditions (7), (7)', and (7)" are satisfied under the following condition (a)'.

$$f_T/f_W > 3.6 \quad (a)'$$

The lens units constituting the zoom lens system according to Embodiments 1 to 8 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the fifth lens unit G5), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

(Embodiment 9)

Figure 25:
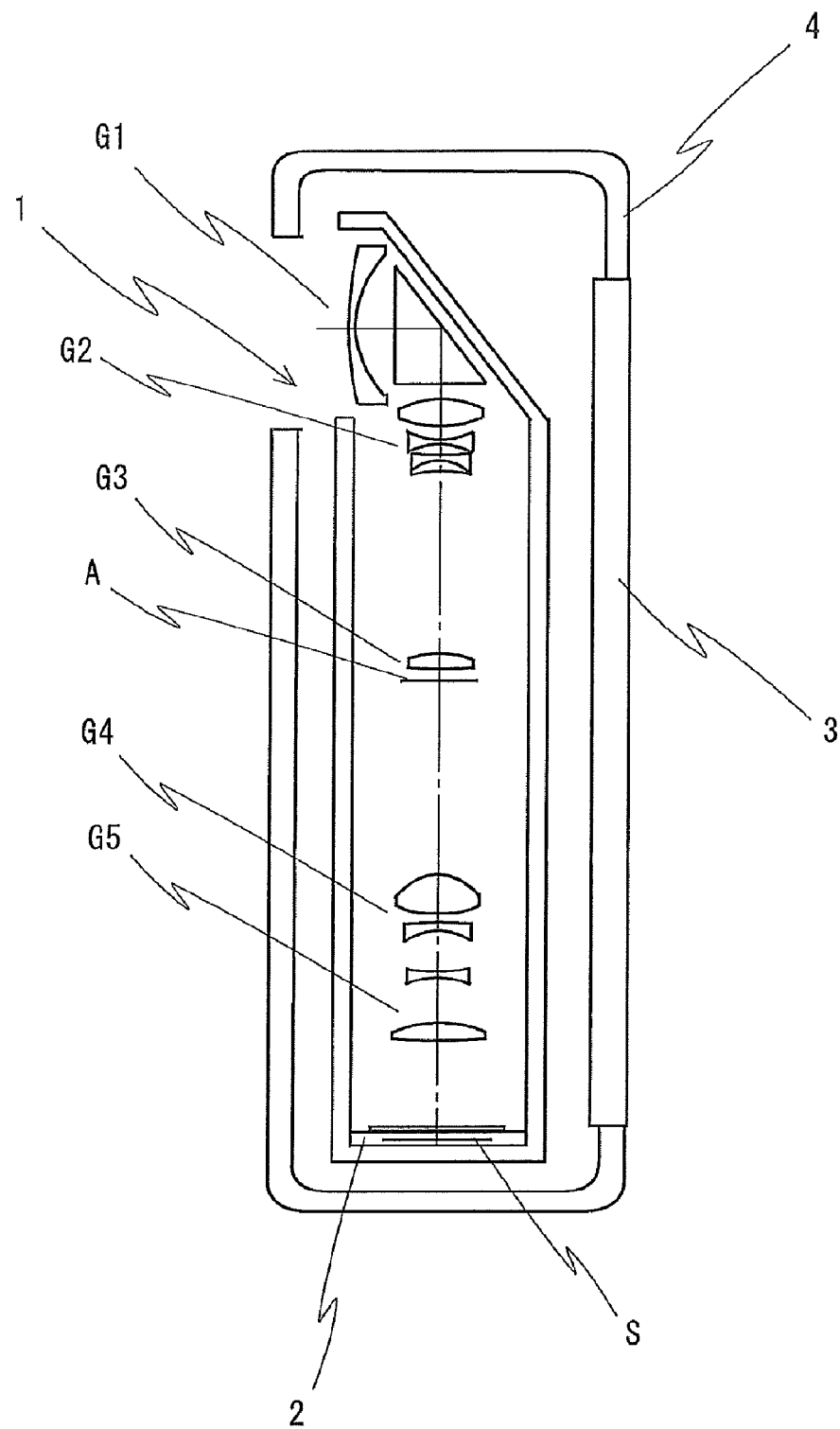
FIG. 25 is a schematic construction diagram of a digital still camera according to Embodiment 9.

FIG. 25 is a schematic construction diagram of a digital still camera according to Embodiment 9. In FIG. 25, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 25, the zoom lens system 1 comprises a first lens unit G1, a second lens unit G2, a third lens unit G3, an aperture diaphragm A, a fourth lens unit G4 and a fifth lens unit G5. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

As such, when the zoom lens system according to Embodiment 1 is employed in a digital still camera, a small digital still camera is obtained that has a high resolution and high capability of compensating the curvature of field and that has a short overall length of lens system at the time of non-use. Here, in the digital still camera shown in FIG. 25, any one of the zoom lens systems according to Embodiments 2 to 8 may be employed in place of the zoom lens system according to Embodiment 1. Further, the optical system of the digital still camera shown in FIG. 25 is applicable also to a digital video camera for moving images. In this case, moving images with high resolution can be acquired in addition to still images.

Here, the digital still camera according to the present Embodiment 9 has been described for a case that the employed zoom lens system 1 is a zoom lens system according to Embodiments 1 to 8. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 8.

Further, an imaging device comprising a zoom lens system according to Embodiments 1 to 8 described above and an image sensor such as a CCD or a CMOS may be applied to a mobile telephone, a PDA (Personal Digital Assistance), a surveillance camera in a surveillance system, a Web camera, a vehicle-mounted camera or the like.

Numerical examples are described below in which the zoom lens systems according to Embodiments 1 to 8 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1 - (1+\kappa)(h/r)^2}} + A4h^4 + A6h^6 + A8h^8 + A10h^{10} + A12h^{12}$$

Here, κ is the conic constant, A4, A6, A8, A10 and A12 are a fourth-order, sixth-order, eighth-order, tenth-order and twelfth-order aspherical coefficients, respectively.

FIGS. 2, 5, 8, 11, 14, 17, 20 and 23 are longitudinal aberration diagrams of the zoom lens systems according to Embodiments 1 to 8, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each spherical aberration diagram shown in FIGS. 8, 11, 14, 20 and 23, the one-dot dash line indicates the characteristics to the g-line. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, 15, 18, 21 and 24 are lateral aberration diagrams of the zoom lens systems at a telephoto limit according to Embodiments 1 to 8, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the most image side lens element in the fifth lens unit G5 is moved by a predetermined amount in a direction perpendicular to the optical axis at a telephoto limit Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram shown in FIGS. 9, 12, 15, 21 and 24, the one-dot dash line indicates the characteristics to the g-line. In each lateral aberration diagram, the meridional plane is adopted as the plane containing the optical axis of the first lens unit G1 and the optical axis of the fifth lens unit G5.

Here, in the zoom lens system according to each example, the amount of movement of the most image side lens element in the fifth lens unit G5 in a direction perpendicular to the optical axis in an image blur compensation state at a telephoto limit is as follows.

| Example | Amount of movement (mm) |
|---|---|
| 1 | 0.221 |
| 2 | 0.252 |

-continued

| Example | Amount of movement (mm) |
|---|---|
| 3 | 0.268 |
| 4 | 0.286 |
| 5 | 0.286 |
| 6 | 0.319 |
| 7 | 0.287 |
| 8 | 0.326 |

Here, when the shooting distance is infinity, at a telephoto limit, the amount of image decentering in a case that the zoom lens system inclines by 0.3° is equal to the amount of image decentering in a case that the most image side lens element in the fifth lens unit G5 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

NUMERICAL EXAMPLE 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data.

TABLE 1

(Surface data)

| Surface number | r | d | nd | vd |
|---|---|---|---|---|
| Object surface | ∞ | | | |
| 1 | 22.36320 | 0.30000 | 1.92286 | 20.9 |
| 2 | 9.40300 | 2.43850 | | |
| 3 | ∞ | 8.41150 | 1.84666 | 23.8 |
| 4 | ∞ | 0.30000 | | |
| 5* | 13.96120 | 2.69350 | 1.58332 | 59.1 |
| 6* | −16.32610 | Variable | | |
| 7 | −14.84640 | 0.30000 | 1.91082 | 35.2 |
| 8 | 13.34750 | 0.62170 | | |
| 9 | −342.82120 | 0.30000 | 1.67790 | 55.5 |
| 10 | 5.79990 | 1.05230 | 1.92286 | 20.9 |
| 11 | 13.81180 | Variable | | |
| 12* | 11.54410 | 1.20000 | 1.52996 | 55.8 |
| 13 | −36.88290 | 0.70000 | | |
| 14(Diaphragm) | ∞ | Variable | | |
| 15 | 5.20650 | 3.46800 | 1.49700 | 81.6 |
| 16 | −17.46270 | 0.40000 | | |
| 17* | 82.83480 | 0.40000 | 1.58387 | 30.9 |
| 18* | 11.01620 | Variable | | |
| 19 | −18.99500 | 0.30000 | 1.92286 | 20.9 |
| 20 | 11.91710 | 2.32660 | | |

TABLE 1-continued (Surface data)

| Surface number | r | d | nd | vd |
|---|---|---|---|---|
| 21* | 10.44420 | 1.64240 | 1.52996 | 55.8 |
| 22 | −28.20210 | 3.76040 | | |
| 23 | ∞ | 0.90000 | 1.51680 | 64.2 |
| 24 | ∞ | (BF) | | |
| Image surface | ∞ | | | |

TABLE 2

(Aspherical data)

Surface No.5
K = 0.00000E+00, A4 = −7.52903E−05, A6 = −4.94683E−08,
A8 = −2.70038E−09 A10 = −9.28591E−10, A12 = 0.00000E+00
Surface No.6
K = 0.00000E+00, A4 = −8.66433E−06, A6 = 2.52010E−07,
A8 = −9.30831E−09 A10 = −6.27307E−10, A12 = 0.00000E+00
Surface No.12
K = −4.87672E−01, A4 = 3.31545E−05, A6 = −4.50242E−05,
A8 = 9.12012E−06 A10 = −8.77204E−07, A12 = 3.09544E−08
Surface No.17
K = 0.00000E+00, A4 = −1.50830E−03, A6 = 1.19286E−04,
A8 = −1.29212E−05 A10 = 3.34977E−07, A12 = 0.00000E+00
Surface No.18
K = 0.00000E+00, A4 = 5.31682E−04, A6 = 2.19664E−04,
A8 = −129212E−05 A10 = 6.57938E−07, A12 = 0.00000E+00
Surface No.21
K = 0.00000E+00, A4 = −2.01496E−06, A6 = −3.57463E−06,
A8 = 4.38004E−07 A10 = −2.53614E−08, A12 = 0.00000E+00

TABLE 3

(Various data)

| Zooming ratio | 3.76923 | | |
|---|---|---|---|
| | Wide-angle limit | Middle position | Telephoto limit |
| Focal length | 5.9832 | 11.6136 | 22.5520 |
| F-number | 3.64111 | 4.12567 | 6.10781 |
| View angle | 36.5921 | 18.7106 | 9.7447 |
| Image height | 3.8000 | 3.9000 | 3.9000 |
| BF | 2.64155 | 2.64100 | 2.64747 |
| d6 | 0.6000 | 5.5737 | 8.7674 |
| d11 | 9.1691 | 4.1954 | 1.0017 |
| d14 | 6.7943 | 4.4212 | 1.2386 |
| d18 | 1.7499 | 4.1230 | 7.3056 |

Zoom lens unit data

| Lens unit | Initial surface No. | Focal length |
|---|---|---|
| 1 | 1 | 19.07798 |
| 2 | 7 | −6.13820 |
| 3 | 12 | 16.73394 |
| 4 | 15 | 11.67695 |
| 5 | 19 | −28.69707 |

NUMERICAL EXAMPLE 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows various data.

TABLE 4

(Surface data)

| Surface number | r | d | nd | vd |
|---|---|---|---|---|
| Object surface | ∞ | | | |
| 1 | 38.58780 | 0.52000 | 1.92286 | 20.9 |
| 2 | 12.21040 | 1.73360 | | |
| 3 | ∞ | 8.59640 | 1.84666 | 23.8 |
| 4 | ∞ | 0.30000 | | |
| 5* | 10.30130 | 2.62640 | 1.58332 | 59.1 |
| 6* | −18.82220 | Variable | | |
| 7 | −50.78410 | 0.40000 | 1.91082 | 35.2 |
| 8 | 7.66810 | 1.13090 | | |
| 9 | −10.67410 | 0.40000 | 1.75500 | 52.3 |
| 10 | 12.61930 | 0.99710 | 1.94595 | 18.0 |
| 11 | −99.30630 | Variable | | |
| 12* | 9.72240 | 1.20000 | 1.54410 | 56.1 |
| 13 | −67.39740 | 0.70000 | | |
| 14(Diaphragm) | ∞ | Variable | | |
| 15 | 5.73680 | 3.05120 | 1.49700 | 81.6 |
| 16 | −19.43100 | 0.83310 | | |
| 17* | −54.38730 | 0.60000 | 1.60740 | 27.0 |
| 18* | 22.17810 | Variable | | |
| 19 | 455.22650 | 0.40000 | 1.92286 | 20.9 |
| 20 | 8.00120 | 2.68810 | | |
| 21* | 8.24010 | 1.61380 | 1.54410 | 56.1 |
| 22* | 161.92230 | 3.75140 | | |
| 23 | ∞ | 0.90000 | 1.51680 | 64.2 |
| 24 | ∞ | (BF) | | |
| Image surface | ∞ | | | |

TABLE 5

(Aspherical data)

Surface No.5
K = 0.00000E+00, A4 = −1.87045E−04, A6 = 4.59316E−06,
A8 = −2.32580E−07 A10 = 4.35310E−09, A12 = 0.00000E+00
Surface No.6
K = 0.00000E+00 A4 = −2.08307E−05, A6 = 6.24682E−06,
A8 = −2.86925E−07 A10 = 5.70515E−09, A12 = 0.00000E+00
Surface No.12
K = −2.46163E+00, A4 = 1.85901E−04, A6 = −3.52144E−05,
A8 = 8.46810E−06 A10 = −8.70148E−07, A12 = 3.09544E−08
Surface No.17
K = 0.00000E+00, A4 = −1.64196E−03, A6 = 2.07706E−04,
A8 = −1.64984E−05 A10 = 4.12615E−07, A12 = 0.00000E+00
Surface No.18
K = 0.00000E+00, A4 = −1.20394E−04, A6 = 2.71174E−04,
A8 = −1.52348E−05 A10 = 3.19840E−07, A12 = 0.00000E+00
Surface No.21
K = 0.00000E+00, A4 = −1.42694E−03, A6 = 6.70968E−05,
A8 = −4.61407E−06 A10 = 1.35990E−07, A12 = 0.00000E+00
Surface No.22
K = 0.00000E+00, A4 = −1.73100E−03, A6 = 9.74237E−05,
A8 = −6.52469E−06 A10 = 1.86747E−07, A12 = 0.00000E+00

TABLE 6

(Various data)

Zooming ratio 3.77255

| | Wide-angle limit | Middle position | Telephoto limit |
|---|---|---|---|
| Focal length | 6.5049 | 12.6309 | 24.5400 |
| F-number | 3.64260 | 4.09772 | 6.11547 |
| View angle | 33.7550 | 17.5079 | 9.0667 |
| Image height | 3.8000 | 3.9000 | 3.9000 |
| BF | 2.65317 | 2.62712 | 2.66976 |
| d6 | 0.5000 | 4.6252 | 7.7435 |
| d11 | 8.0252 | 3.9000 | 0.7816 |

TABLE 6-continued

| | | | |
|---|---|---|---|
| d14 | 6.1668 | 3.9649 | 1.7902 |
| d18 | 1.6147 | 3.8166 | 5.9914 |

Zoom lens unit data

| Lens unit | Initial surface No. | Focal length |
|---|---|---|
| 1 | 1 | 15.47793 |
| 2 | 7 | −5.30941 |
| 3 | 12 | 15.70217 |
| 4 | 15 | 12.43422 |
| 5 | 19 | −31.61097 |

NUMERICAL EXAMPLE 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows various data.

TABLE 7

(Surface data)

| Surface number | r | d | nd | vd |
|---|---|---|---|---|
| Object surface | ∞ | | | |
| 1 | 25.55550 | 0.30000 | 1.92286 | 20.9 |
| 2 | 10.54410 | 1.98790 | | |
| 3 | ∞ | 8.56210 | 1.84666 | 23.8 |
| 4 | ∞ | 0.30000 | | |
| 5* | 10.74960 | 2.75970 | 1.58332 | 59.1 |
| 6* | −17.31600 | Variable | | |
| 7 | −29.89150 | 0.30000 | 1.91082 | 35.2 |
| 8 | 8.49950 | 0.99360 | | |
| 9 | −13.66140 | 0.30000 | 1.74624 | 51.4 |
| 10 | 9.94510 | 0.94595 | 1.94595 | 18.0 |
| 11 | 115.60180 | Variable | | |
| 12* | 9.11110 | 1.20000 | 1.54410 | 56.1 |
| 13 | −172.22630 | 0.70000 | | |
| 14(Diaphragm) | ∞ | Variable | | |
| 15 | 5.70430 | 3.12090 | 1.49700 | 81.6 |
| 16 | −19.90500 | 0.55020 | | |
| 17* | 34.48440 | 0.50000 | 1.60740 | 27.0 |
| 18* | 11.30600 | Variable | | |
| 19 | −58.93060 | 0.40000 | 1.92286 | 20.9 |
| 20 | 10.05090 | 2.67540 | | |
| 21* | 8.13110 | 1.53330 | 1.54410 | 56.1 |
| 22* | 55.32230 | 3.88000 | | |
| 23 | ∞ | 0.90000 | 1.51680 | 64.2 |
| 24 | ∞ | (BF) | | |
| Image surface | ∞ | | | |

TABLE 8

(Aspherical data)

Surface No.5
K = 0.00000E+00, A4 = −1.58141E−04, A6 = 4.21542E−06,
A8 = −2.08493E−07 A10 = 4.17040E−09, A12 = 0.00000E+00
Surface No.6
K = 0.00000E+00, A4 = −5.91940E−06, A6 = 5.64487E−06,
A8 = −2.54795E−07 A10 = 5.28741E−09, A12 = 0.00000E+00
Surface No.12
K = −2.18268E+00, A4 = 2.13258E−04, A6 = −3.84942E−05,
A8 = 8.68021E−06 A10 = −8.72920E−07, A12 = 3.09544E−08
Surface No.17
K = 0.00000E+00, A4 = −1.75572E−03, A6 = 1.99792E−04,
A8 = −1.83639E−05 A10 = 4.82819E−07, A12 = 0.00000E+00

TABLE 8-continued (Aspherical data)

Surface No.18  
K = 0.00000E+00, A4 = −2.42755E−04, A6 = 2.77773E−04,  
A8 = −1.70891E−05 A10 = 3.64099E−07, A12 = 0.00000E+00  
Surface No.21  
K = 0.00000E+00, A4 = −2.22297E−03. A6 = 9.72757E−05,  
A8 = −6.21028E−06 A10 = 9.78631E−08, A12 = 0.00000E+00  
Surface No.22  
K = 0.00000E+00, A4 = −2.45616E−03, A6 = 1.07548E−04,  
A8 = −6.32138E−06 A10 = 1.01831E−07, A12 = 0.00000E+00

TABLE 9

(Various data)

Zooming ratio  3.77007

|  | Wide-angle limit | Middle position | Telephoto limit |
|---|---|---|---|
| Focal length | 6.5053 | 12.6297 | 24.5254 |
| F-number | 3.64299 | 4.09877 | 6.11364 |
| View angle | 33.7415 | 17.5731 | 9.1332 |
| Image height | 3.8000 | 3.9000 | 3.9000 |
| BF | 2.63047 | 2.62999 | 2.66213 |
| d6 | 0.5000 | 4.5804 | 7.7299 |
| d11 | 8.0669 | 3.9864 | 0.8369 |
| d14 | 5.9046 | 3.7946 | 1.8002 |
| d18 | 1.8935 | 4.0035 | 5.9979 |

Zoom lens unit data

| Lens unit | Initial surface No. | Focal length |
|---|---|---|
| 1 | 1 | 15.09547 |
| 2 | 7 | −5.34004 |
| 3 | 12 | 15.94109 |
| 4 | 15 | 12.17035 |
| 5 | 19 | −29.18821 |

NUMERICAL EXAMPLE 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows various data.

TABLE 10

(Surface data)

| Surface number | r | d | nd | vd |
|---|---|---|---|---|
| Object surface | ∞ | | | |
| 1 | 36.03060 | 0.52000 | 1.92286 | 20.9 |
| 2 | 13.50780 | 1.88780 | | |
| 3 | ∞ | 8.53020 | 1.84666 | 23.8 |
| 4 | ∞ | 0.30000 | | |
| 5* | 11.13080 | 3.16490 | 1.58332 | 59.1 |
| 6* | −19.83960 | Variable | | |
| 7 | −16.10980 | 0.40000 | 1.90366 | 31.3 |
| 8 | 5.95660 | 0.81920 | | |
| 9* | 98.48670 | 0.60000 | 1.52996 | 55.8 |
| 10 | 6.57120 | 1.13280 | 1.94595 | 18.0 |
| 11 | 22.77550 | Variable | | |
| 12* | 10.05750 | 1.20000 | 1.52996 | 55.8 |
| 13* | −26.74320 | 0.70000 | | |
| 14(Diaphragm) | ∞ | Variable | | |
| 15 | 8.89340 | 2.07220 | 1.49700 | 81.6 |
| 16 | −13.90680 | 0.40000 | | |
| 17* | 45.51420 | 0.66080 | 1.58387 | 30.9 |
| 18 | 28.49560 | Variable | | |
| 19 | 18.62580 | 0.43000 | 1.94595 | 18.0 |
| 20 | 6.20860 | 1.92100 | | |
| 21* | 7.25740 | 1.18810 | 1.52996 | 55.8 |
| 22 | 15.99740 | 6.05500 | | |
| 23 | ∞ | 0.80000 | 1.51680 | 64.2 |
| 24 | ∞ | (BF) | | |
| Image surface | ∞ | | | |

TABLE 11

(Aspherical data)

Surface No.5  
K = 0.00000E+00, A4 = −7.93723E−05, A6 = 3.26806E−07,  
A8 = −1.35973E−08 A10 = −4.90795E−10, A12 = 0.00000E+00  
Surface No.6  
K = 0.00000E+00, A4 = 7.30213E−05, A6 = 1.11962E−06,  
A8 = −5.55275E−08 A10 = 3.01187E−10, A12 = 0.00000E+00  
Surface No.9  
K = 0.00000E+00, A4 = 9.24023E−04, A6 = −1.62194E−05,  
A8 = 5.24200E−06 A10 = −1.79773E−07, A12 = 0.00000E+00  
Surface No.12  
K = −1.14409E+01, A4 = −5.60893E−04, A6 = −6.35144E−05,  
A8 = 2.01885E−06 A10 = −2.69324E−07, A12 = −3.87818E−08  
Surface No.13  
K = 0.00000E+00, A4 = −5.60893E−04, A6 = −6.35144E−05,  
A8 = 2.01885E−06 A10 = −7.10427E−07, A12 = 0.00000E+00  
Surface No.17  
K = 0.00000E+00, A4 = −7.13093E−04, A6 = −9.82399E−06,  
A8 = 1.02657E−07 A10 = 0.00000E+00, A12 = 0.00000E+00  
Surface No.21  
K = 0.00000E+00, A4 = −8.67693E−05, A6 = −2.68690E−06,  
A8 = 0.00000E+00 A10 = 0.00000E+00, A12 = 0.00000E+00

TABLE 12

(Various data)

Zooming ratio  3.76172

|  | Wide-angle limit | Middle position | Telephoto limit |
|---|---|---|---|
| Focal length | 6.4034 | 12.4312 | 24.0876 |
| F-number | 3.62972 | 3.92718 | 6.08716 |
| View angle | 33.6068 | 17.3388 | 8.9872 |
| Image height | 3.8000 | 3.9000 | 3.9000 |
| BF | 2.61023 | 2.63788 | 2.61979 |
| d6 | 0.5000 | 5.0646 | 8.7534 |
| d11 | 8.7534 | 4.1888 | 0.5000 |
| d14 | 4.3344 | 2.7913 | 1.7438 |
| d18 | 0.8000 | 2.3431 | 3.3906 |

Zoom lens unit data

| Lens unit | Initial surface No. | Focal length |
|---|---|---|
| 1 | 1 | 16.37628 |
| 2 | 7 | −5.59597 |
| 3 | 12 | 13.94882 |
| 4 | 15 | 12.06021 |
| 5 | 19 | −18.82754 |

NUMERICAL EXAMPLE 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows various data.

TABLE 13

(Surface data)

| Surface number | r | d | nd | vd |
|---|---|---|---|---|
| Object surface | ∞ | | | |
| 1 | 154.14640 | 0.52000 | 1.92286 | 20.9 |
| 2 | 18.07620 | 1.42450 | | |
| 3 | ∞ | 8.79090 | 1.84666 | 23.8 |
| 4 | ∞ | 0.30000 | | |
| 5* | 11.62860 | 3.22950 | 1.52996 | 55.8 |
| 6* | −16.56670 | Variable | | |
| 7 | −18.04790 | 0.50000 | 1.83481 | 42.7 |
| 8 | 9.63380 | 0.83760 | | |
| 9 | −79.91100 | 0.60000 | 1.52996 | 55.8 |
| 10* | 7.00190 | 0.28170 | | |
| 11 | 9.82840 | 0.89950 | 1.94595 | 18.0 |
| 12 | 23.91220 | Variable | | |
| 13* | 5.94630 | 1.20000 | 1.52996 | 55.8 |
| 14* | 17.74680 | 0.70000 | | |
| 15 (Diaphragm) | ∞ | Variable | | |
| 16 | 4.69520 | 2.67350 | 1.49700 | 81.6 |
| 17 | −49.74580 | 0.40000 | | |
| 18* | 20.68890 | 0.40000 | 1.58387 | 30.9 |
| 19* | 10.29320 | Variable | | |
| 20 | −5565.50510 | 0.43000 | 1.92286 | 20.9 |
| 21 | 7.80570 | 2.18000 | | |
| 22* | 8.60050 | 1.29390 | 1.52996 | 55.8 |
| 23 | 42.75010 | 4.65200 | | |
| 24 | ∞ | 0.80000 | 1.51680 | 64.2 |
| 25 | ∞ | (BF) | | |
| Image surface | ∞ | | | |

TABLE 14

(Aspherical data)

Surface No.5
K = 0.00000E+00, A4 = −6.96141E−05, A6 = 2.09017E−07,
A8 = −5.37812E−09 A10 = −5.90342E−10, A12 = 0.00000E+00
Surface No.6
K = 0.00000E+00, A4 = 1.12338E−04, A6 = 1.03355E−06,
A8 = −5.30511E−08 A10 = 2.48002E−10, A12 = 0.00000E+00
Surface No.10
K = 0.00000E+00, A4 = −7.26320E−04, A6 = 3.87560E−06,
A8 = −1.14077E−06 A10 = 4.57706E−08, A12 = 0.00000E+00
Surface No.13
K = −1.44129E−01, A4 = 2.58044E−04, A6 = 3.95790E−06,
A8 = 4.42311E−06 A10 = −2.82711E−07, A12 = 2.75522E−08
Surface No.14
K = 0.00000E+00, A4 = 6.65022E−04, A6 = 3.45900E−05,
A8 = −1.46423E−06 A10 = 4.79384E−07, A12 = 0.00000E+00
Surface No.18
K = 0.00000E+00, A4 = −6.40259E−04, A6 = 5.15963E−05,
A8 = −7.67678E−06 A10 = 0.00000E+00, A12 = 0.00000E+00
Surface No.19
K = 0.00000E+00, A4 = 2.35809E−03, A6 = 1.70471E−04,
A8 = 2.48873E−06 A10 = 1.01885E−07, A12 = 0.00000E+00
Surface No.22
K = 0.00000E+00, A4 = −5.53647E−05, A6 = 6.84823E−06,
A8 = 0.00000E+00 A10 = 0.00000E+00, A12 = 0.00000E+00

TABLE 15

(Various data)

Zooming ratio 3.75996

| | Wide-angle limit | Middle position | Telephoto limit |
|---|---|---|---|
| Focal length | 6.3999 | 12.4101 | 24.0635 |
| F-number | 3.64069 | 3.99379 | 6.10093 |
| View angle | 34.3798 | 17.4205 | 9.0025 |
| Image height | 3.8000 | 3.9000 | 3.9000 |
| BF | 2.61010 | 2.62010 | 2.61014 |
| d6 | 0.5000 | 5.4527 | 9.3334 |
| d12 | 9.3334 | 4.3806 | 0.5000 |
| d15 | 4.4329 | 2.9745 | 1.6000 |
| d19 | 0.8005 | 2.2590 | 3.6335 |

Zoom lens unit data

| Lens unit | Initial surface No. | Focal length |
|---|---|---|
| 1 | 1 | 18.46803 |
| 2 | 7 | −6.16401 |
| 3 | 13 | 16.30005 |
| 4 | 16 | 10.62913 |
| 5 | 20 | −17.57533 |

NUMERICAL EXAMPLE 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows various data.

TABLE 16

(Surface data)

| Surface number | r | d | nd | vd |
|---|---|---|---|---|
| Object surface | ∞ | | | |
| 1 | 27.06410 | 0.30000 | 1.92286 | 20.9 |
| 2 | 10.81980 | 1.95100 | | |
| 3 | ∞ | 8.59900 | 1.84666 | 23.8 |
| 4 | ∞ | 0.30000 | | |
| 5* | 10.91490 | 2.63550 | 1.58332 | 59.1 |
| 6* | −17.88190 | Variable | | |
| 7 | −26.12040 | 0.30000 | 1.91082 | 35.2 |
| 8 | 8.65740 | 0.95830 | | |
| 9 | −18.18840 | 0.30000 | 1.72000 | 50.3 |
| 10 | 8.89240 | 1.02170 | 1.94595 | 18.0 |
| 11 | 54.24380 | Variable | | |
| 12* | 8.02280 | 1.20000 | 1.54410 | 56.1 |
| 13 | 49.79170 | 0.70000 | | |
| 14(Diaphragm) | ∞ | Variable | | |
| 15 | 5.80210 | 2.97260 | 1.49700 | 81.6 |
| 16 | −19.79690 | 0.62550 | | |
| 17* | 15.65670 | 0.50000 | 1.63400 | 23.9 |
| 18* | 8.75030 | Variable | | |
| 19 | −18.22160 | 0.40000 | 1.92286 | 20.9 |
| 20 | 18.79960 | 2.42550 | | |
| 21* | 8.77160 | 1.39610 | 1.54410 | 56.1 |
| 22* | 39.01940 | 3.85010 | | |
| 23 | ∞ | 0.90000 | 1.51680 | 64.2 |
| 24 | ∞ | (BF) | | |
| Image surface | ∞ | | | |

TABLE 17

(Aspherical data)

Surface No.5
K = 0.00000E+00, A4 = −1.65904E−04, A6 = 4.25212E−06,
A8 = −1.67809E−07 A10 = 2.80373E−09, A12 = 0.00000E+00
Surface No.6
K = 0.00000E+00, A4 = −2.43425E−05, A6 = 6.01483E−06,
A8 = −2.27454E−07 A10 = 3.94780E−09, A12 = 0.00000E+00
Surface No.12
K = −1.82624E+00, A4 = 2.60376E−04, A6 = −4.56076E−05,
A8 = 9.52057E−06 A10 = −9.05434E−07, A12 = 3.09544E−08
Surface No.17
K = 0.00000E+00, A4 = −1.62015E−03, A6 = 1.54323E−04,
A8 = −1.95751E−05 A10 = 5.52127E−07, A12 = 0.00000E+00
Surface No.18
K = 0.00000E+00, A4 = −2.03161E−04, A6 = 2.38466E−04,
A8 = −1.88715E−05 A10 = 3.68843E−07, A12 = 0.00000E+00
Surface No.21
K = 0.00000E+00, A4 = −2.22757E−03, A6 = 1.29905E−04,
A8 = −6.96293E−06 A10 = 9.10363E−08, A12 = 0.00000E+00
Surface No.22
K = 0.00000E+00, A4 = −2.50313E−03, A6 = 1.46871E−04,
A8 = −8.05300E−06 A10 =1.36781E−07, A12 = 0.00000E+00

TABLE 18

(Various data)

Zooming ratio  3.77053

| | Wide-angle limit | Middle position | Telephoto limit |
|---|---|---|---|
| Focal length | 6.5036 | 12.6267 | 24.5219 |
| F-number | 3.64295 | 4.09733 | 6.11128 |
| View angle | 33.9579 | 17.6773 | 9.1846 |
| Image height | 3.8000 | 3.9000 | 3.9000 |
| BF | 2.60720 | 2.64830 | 2.65249 |
| d6 | 0.5000 | 4.7555 | 8.0966 |
| d11 | 8.4203 | 4.1648 | 0.8236 |
| d14 | 5.6166 | 3.6687 | 1.8461 |
| d18 | 2.1535 | 4.1014 | 5.9240 |

Zoom lens unit data

| Lens unit | Initial surface No. | Focal length |
|---|---|---|
| 1 | 1 | 15.65417 |
| 2 | 7 | −5.62199 |
| 3 | 12 | 17.40110 |
| 4 | 15 | 11.74487 |
| 5 | 19 | −24.84355 |

NUMERICAL EXAMPLE 7

The zoom lens system of Numerical Example 7 corresponds to Embodiment 7 shown in FIG. 19. Table 19 shows the surface data of the zoom lens system of Numerical Example 7. Table 20 shows the aspherical data. Table 21 shows various data.

TABLE 19

(Surface data)

| Surface number | r | d | nd | vd |
|---|---|---|---|---|
| Object surface | ∞ | | | |
| 1 | 106.90430 | 0.48000 | 1.92286 | 20.9 |
| 2 | 17.81640 | 1.52620 | | |
| 3 | ∞ | 8.93890 | 1.84666 | 23.8 |
| 4 | ∞ | 0.30000 | | |

TABLE 19-continued (Surface data)

| Surface number | r | d | nd | vd |
|---|---|---|---|---|
| 5* | 11.61560 | 3.28940 | 1.52996 | 55.8 |
| 6* | −17.60310 | Variable | | |
| 7 | −27.90300 | 0.50000 | 1.90366 | 31.3 |
| 8 | 8.25920 | 0.98920 | | |
| 9 | −22.57930 | 0.60000 | 1.51680 | 64.2 |
| 10 | 7.48830 | 1.01310 | 1.94595 | 18.0 |
| 11 | 19.50890 | Variable | | |
| 12* | 6.15200 | 1.20000 | 1.52996 | 55.8 |
| 13* | 19.92640 | 0.70000 | | |
| 14(Diaphragm) | ∞ | Variable | | |
| 15 | 4.80720 | 2.83380 | 1.49700 | 81.6 |
| 16 | −25.65830 | 0.40000 | | |
| 17* | 22.89370 | 0.40000 | 1.58387 | 30.9 |
| 18* | 10.38180 | Variable | | |
| 19 | −40.31500 | 0.43000 | 1.92286 | 20.9 |
| 20 | 8.84630 | 2.10920 | | |
| 21* | 9.90380 | 1.31810 | 1.52996 | 55.8 |
| 22 | 734.10410 | 4.29280 | | |
| 23 | ∞ | 0.80000 | 1.51680 | 64.2 |
| 24 | ∞ | (BF) | | |
| Image surface | ∞ | | | |

TABLE 20

(Aspherical data)

Surface No.5
K = 0.00000E+00, A4 = −7.95082E−05, A6 = 2.39014E−07,
A8 = −1.79534E−09 A10 = −4.13824E−10, A12 = 0.00000E+00
Surface No.6
K = 0.00000E+00, A4 = 8.42514E−05, A6 = 1.10963E−06,
A8 = −3.90968E−08 A10 = 1.74792E−10, A12 = 0.00000E+00
Surface No.12
K = −2.92135E−01, A4 = 2.63028E−04, A6 = −2.28617E−05,
A8 = 7.86783E−06 A10 = −6.04652E−07, A12 = 3.09217E−08
Surface No.13
K = 0.00000E+00, A4 = 5.16647E−04, A6 = 2.67263E−06,
A8 = 1.92636E−06 A10 = 1.50148E−07, A12 = 0.00000E+00
Surface No.17
K = 0.00000E+00, A4 = −1.74522E−03, A6 = −7.32413E−06,
A8 = 3.88726E−07 A10 = 0.00000E+00, A12 = 0.00000E+00
Surface No.18
K = 0.00000E+00, A4 = 1.16219E−03, A6 = 1.21059E−04,
A8 = 8.54823E−07 A10 = 7.29340E−07, A12 = 0.00000E+00
Surface No.21
K = 0.00000E+00, A4 = − 4.22890E−05, A6 = 1.89880E−06,
A8 = 0.00000E+00 A10 = 0.00000E+00, A12 = 0.00000E+00

TABLE 21

(Various data)

Zooming ratio  3.75935

| | Wide-angle limit | Middle position | Telephoto limit |
|---|---|---|---|
| Focal length | 6.4063 | 12.4305 | 24.0837 |
| F-number | 3.63058 | 3.97156 | 6.08893 |
| View angle | 34.2727 | 17.3892 | 8.9928 |
| Image height | 3.8000 | 3.9000 | 3.9000 |
| BF | 2.61753 | 2.63530 | 2.62333 |
| d6 | 0.5000 | 5.5164 | 9.4592 |
| d11 | 9.4592 | 4.4427 | 0.5000 |
| d14 | 4.2114 | 2.8566 | 1.6000 |
| d18 | 0.8786 | 2.2335 | 3.4901 |

Zoom lens unit data

| Lens unit | Initial surface No. | Focal length |
|---|---|---|
| 1 | 1 | 18.78179 |
| 2 | 7 | −6.21818 |
| 3 | 12 | 16.30113 |
| 4 | 15 | 10.23850 |
| 5 | 19 | −16.52861 |

NUMERICAL EXAMPLE 8

The zoom lens system of Numerical Example 8 corresponds to Embodiment 8 shown in FIG. 22. Table 22 shows the surface data of the zoom lens system of Numerical Example 8. Table 23 shows the aspherical data. Table 24 shows various data.

TABLE 22

(Surface data)

| Surface number | r | d | nd | vd |
|---|---|---|---|---|
| Object surface | ∞ | | | |
| 1 | 14.50920 | 0.52000 | 1.92084 | 22.9 |
| 2 | 8.30440 | 2.83000 | | |
| 3 | ∞ | 8.60000 | 1.84666 | 23.8 |
| 4 | ∞ | 0.30000 | | |
| 5* | 14.25090 | 2.71840 | 1.61255 | 60.7 |
| 6* | −15.66080 | Variable | | |
| 7 | −27.85210 | 0.40000 | 1.88300 | 40.8 |
| 8 | 9.74820 | 1.05390 | | |
| 9 | −13.81990 | 0.40000 | 1.75535 | 50.3 |
| 10 | 10.56310 | 0.99020 | 1.94595 | 18.0 |
| 11 | 89.00880 | Variable | | |
| 12* | 8.57000 | 0.70000 | 1.60740 | 27.0 |
| 13 | 7.84000 | 0.70000 | | |
| 14 | 10.74610 | 1.20000 | 1.54410 | 56.1 |
| 15 | −42.45410 | 0.30000 | | |
| 16(Diaphragm) | ∞ | Variable | | |
| 17* | 7.39490 | 2.97190 | 1.49700 | 81.6 |
| 18 | −10.39490 | 0.30410 | | |
| 19* | 351.44980 | 0.60000 | 1.60740 | 27.0 |
| 20* | 10.70980 | Variable | | |
| 21 | ∞ | 0.40000 | 1.90331 | 28.6 |
| 22 | 17.00500 | 5.45520 | | |
| 23* | 7.02030 | 1.98040 | 1.54410 | 56.1 |
| 24* | 12.50480 | 4.44150 | | |
| 25 | ∞ | 0.90000 | 1.51680 | 64.2 |
| 26 | ∞ | (BF) | | |
| Image surface | ∞ | | | |

TABLE 23

(Aspherical data)

Surface No.5
$K = 0.00000E+00, A4 = -1.45356E-04, A6 = 6.00023E-06,$
$A8 = -1.82799E-07\ A10 = 2.23415E-09, A12 = 0.00000E+00$ Surface No.6
$K = 0.00000E+00, A4 = -7.81843E-05, A6 = 7.59466E-06,$
$A8 = -2.52496E-07\ A10 = 3.40061E-09, A12 = 0.00000E+00$ Surface No.12
$K = -1.11379E+00, A4 = 1.82841E-04, A6 = -4.60969E-05,$
$A8 = 9.81313E-06\ A10 = -9.11010E-07, A12 = 3.09544E-08$ Surface No.17
$K = 0.00000E+00, A4 = -3.97460E-05, A6 = -2.39801E-05,$
$A8 = -3.10451E-07\ A10 = 1.15424E-09, A12 = 0.00000E+00$ Surface No.19
$K = 0.00000E+00, A4 = -1.61975E-03, A6 = 2.22811E-04,$
$A8 = -1.19271E-05\ A10 = 2.81182E-07, A12 = 0.00000E+00$ Surface No.20
$K = 0.00000E+00, A4 = -8.60357E-04, A6 = 2.42245E-04,$
$A8 = -1.32293E-05\ A10 = 2.51915E-07, A12 = 0.00000E+00$ Surface No.23
$K = 0.00000E+00, A4 = -1.54234E-03, A6 = 6.91374E-05,$
$A8 = -3.65492E-06\ A10 = 3.45697E-08, A12 = 0.00000E+00$ Surface No.24
$K = 0.00000E+00, A4 = -2.08667E-03, A6 = 1.24930E-04,$
$A8 = -6.70979E-06\ A10 = 1.08204E-07, A12 = 0.00000E+00$

TABLE 24

(Various data)

Zooming ratio  3.76876

| | Wide-angle limit | Middle position | Telephoto limit |
|---|---|---|---|
| Focal length | 6.5037 | 12.6249 | 24.5107 |
| F-number | 3.64192 | 4.09047 | 6.10732 |
| View angle | 33.6180 | 17.7533 | 9.3390 |
| Image height | 3.8000 | 3.9000 | 3.9000 |
| BF | 2.60547 | 2.60982 | 2.65391 |
| d6 | 0.5000 | 4.8482 | 8.1986 |
| d11 | 8.3986 | 4.0504 | 0.7000 |
| d16 | 8.6584 | 5.7544 | 3.1926 |
| d20 | 1.2834 | 4.1873 | 6.7491 |

| Lens unit | Initial surface No. | Focal length |
|---|---|---|
| 1 | 1 | 15.75309 |
| 2 | 7 | −5.64509 |
| 3 | 12 | 17.53750 |
| 4 | 17 | 15.35206 |
| 5 | 21 | −150.07612 |

The following Table 25 shows the corresponding values to the individual conditions in the zoom lens systems of the numerical examples.

TABLE 25

(Corresponding values to conditions)

| | | Example | | | | | |
|---|---|---|---|---|---|---|---|
| Condition | | 1 | 2 | 3 | 4 | 5 | 6 |
| (1) | $nd_{4ave}$ | 1.540 | 1.552 | 1.552 | 1.543 | 1.540 | 1.566 |
| (2-1) | $nd_4$ | 1.584(L9) | 1.607(L9) | 1.607(L9) | 1.584(L9) | 1.584(L9) | 1.634(L9) |
| (2-2) | $vd_4$ | 30.9(L9) | 27.0(L9) | 27.0(L9) | 30.9(L9) | 30.9(L9) | 23.9(L9) |

(Example 3)

| Lens unit | Lens element | Condition | | | |
|---|---|---|---|---|---|
| | | (3-1): vd | (4-1) | (3-2): $vd_3$ | (4-2) |
| G1 | L1 | — | — | — | — |
| | L2 | — | — | — | — |
| | L3 | — | — | — | — |
| G2 | L4 | — | — | — | — |
| | L5 | — | — | — | — |
| | L6 | — | — | — | — |
| G3 | L7 | 56.1 | 0.015196 | 56.1 | 0.015196 |
| G4 | L8 | — | — | — | — |
| | L9 | 27.0 | 0.008694 | — | — |
| G5 | L10 | — | — | — | — |
| | L11 | 56.1 | 0.015196 | — | — |

(Example 4)

| Lens unit | Lens element | (3-1): vd | (4-1) | (3-2): $vd_3$ | (4-2) |
|---|---|---|---|---|---|
| G1 | L1 | — | — | — | — |
| | L2 | — | — | — | — |
| | L3 | — | — | — | — |
| G2 | L4 | — | — | — | — |
| | L5 | 55.8 | 0.016232 | — | — |
| | L6 | — | — | — | — |
| G3 | L7 | 55.8 | 0.016232 | 55.8 | 0.016232 |
| G4 | L8 | — | — | — | — |
| | L9 | 30.9 | 0.043347 | — | — |
| G5 | L10 | — | — | — | — |
| | L11 | 55.8 | 0.016232 | — | — |

(Example 5)

| Lens unit | Lens element | (3-1): vd | (4-1) | (3-2): $vd_3$ | (4-2) |
|---|---|---|---|---|---|
| G1 | L1 | — | — | — | — |
| | L2 | — | — | — | — |
| | L3 | 55.8 | 0.016232 | — | — |
| G2 | L4 | — | — | — | — |
| | L5 | 55.8 | 0.016232 | — | — |
| | L6 | — | — | — | — |
| G3 | L7 | 55.8 | 0.016232 | 55.8 | 0.016232 |
| G4 | L8 | — | — | — | — |
| | L9 | 30.9 | 0.043347 | — | — |
| G5 | L10 | — | — | — | — |
| | L11 | 55.8 | 0.016232 | — | — |

(Example 7)

| Lens unit | Lens element | (3-1): vd | (4-1) | (3-2): $vd_3$ | (4-2) |
|---|---|---|---|---|---|
| G1 | L1 | — | — | — | — |
| | L2 | — | — | — | — |
| | L3 | 55.8 | 0.016232 | — | — |
| G2 | L4 | — | — | — | — |
| | L5 | — | — | — | — |
| | L6 | — | — | — | — |
| G3 | L7 | 55.8 | 0.016232 | 55.8 | 0.016232 |
| G4 | L8 | — | — | — | — |
| | L9 | 30.9 | 0.043347 | — | — |
| G5 | L10 | — | — | — | — |
| | L11 | 55.8 | 0.016232 | — | — |

(Example 8)

| Lens unit | Lens element | (3-1): vd | (4-1) | (3-2): $vd_3$ | (4-2) |
|---|---|---|---|---|---|
| G1 | L1 | — | — | — | — |
| | L2 | — | — | — | — |
| | L3 | — | — | — | — |
| G2 | L4 | — | — | — | — |
| | L5 | — | — | — | — |
| | L6 | — | — | — | — |
| G3 | L7 | 27.0 | 0.008694 | 27.0 | 0.008694 |
| | L8 | 56.1 | 0.015196 | 56.1 | 0.015196 |
| | L9 | — | — | — | — |

TABLE 25-continued (Corresponding values to conditions)

| | | | | | | |
|---|---|---|---|---|---|---|
| G4 | L10 | 27.0 | 0.008694 | — | — | — |
| | L11 | — | — | — | — | — |
| G5 | L12 | 56.1 | 0.015196 | — | — | — |

| | | Example | | | | | | | |
|---|---|---|---|---|---|---|---|---|---|
| Condition | | 1 | 2 | 3 | 4 | 5 | 6 | 7 | 8 |
| (5) | $f_W/t_{G2}$ | 2.631 | 2.222 | 2.521 | 2.169 | 2.052 | 2.521 | 2.064 | 2.287 |
| (6) | $vd_4$ | 81.6(L8) | 81.6(L8) | 81.6(L8) | 81.6(L8) | 81.6(L8) | 81.6(L8) | 81.6(L8) | 81.6(L9) |
| (7) | $f_{G2}/f_{G4}$ | −0.526 | −0.427 | −0.439 | −0.464 | −0.580 | −0.479 | −0.608 | −0.368 |
| (a) | $f_T/f_W$ | 3.77 | 3.77 | 3.77 | 3.76 | 3.76 | 3.77 | 3.76 | 3.77 |

The zoom lens system according to the present invention is applicable to a digital input device such as a digital camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital camera.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system, in order from an object side to an image side, comprising a first lens unit having positive optical power, a second lens unit having negative optical power, a third lens unit having positive optical power, and subsequent lens units including a fourth lens unit having optical power, wherein
   any one of the first lens unit, the second lens unit, the third lens unit, and the subsequent lens units includes a lens element having a reflecting surface that bends a light beam incident from an object, wherein
   in zooming from a wide-angle limit to a telephoto limit at the time of image taking, the first lens unit and the third lens unit do not move along an optical axis, and wherein the following condition (1) is satisfied:

$$1.42 < nd_{4ave} < 1.58 \qquad (1)$$

where,
   $nd_{4ave}$ is an average of refractive indices to the d-line of the lens elements constituting the fourth lens unit.

2. The zoom lens system as claimed in claim 1, wherein the first lens unit comprises a lens element having a reflecting surface, and two lens elements each having optical power.

3. The zoom lens system as claimed in claim 1, wherein the following conditions (5) and (a) are satisfied:

$$2.0 < f_W/t_{G2} < 7.0 \qquad (5)$$

$$f_T/f_W > 2.5 \qquad (a)$$

where,
   $t_{G2}$ is a thickness of the second lens unit (a distance on the optical axis from an object side surface of a most object side lens element to an image side surface of a most image side lens element),
   $f_T$ is a focal length of the entire system at a telephoto limit, and
   $f_W$ is a focal length of the entire system at a wide-angle limit.

4. An imaging device capable of outputting an optical image of an object as an electric image signal, comprising:
   a zoom lens system that forms an optical image of the object; and
   an image sensor that converts the optical image formed by the zoom lens system into the electric image signal, wherein
   the zoom lens system is a zoom lens system as claimed in claim 1.

5. A camera for converting an optical image of an object into an electric image signal and then performing at least one of displaying and storing of the converted image signal, comprising:
   an imaging device including a zoom lens system that forms the optical image of the object and an image sensor that converts the optical image formed by the zoom lens system into the electric image signal, wherein
   the zoom lens system is a zoom lens system as claimed in claim 1.

6. A zoom lens system, in order from an object side to an image side, comprising a first lens unit having positive optical power, a second lens unit having negative optical power, a third lens unit having positive optical power, and subsequent lens units including a fourth lens unit having optical power, wherein
   any one of the first lens unit, the second lens unit, the third lens unit, and the subsequent lens units includes a lens element having a reflecting surface that bends a light beam incident from an object, wherein
   in zooming from a wide-angle limit to a telephoto limit at the time of image taking, the first lens unit and the third lens unit do not move along an optical axis, and wherein
   at least one of all the lens elements constituting the fourth lens unit satisfies the following conditions (2-1) and (2-2), simultaneously:

$$1.42 < nd_4 < 1.66 \qquad (2\text{-}1)$$

$$15 < vd_4 < 36 \qquad (2\text{-}2)$$

where,
   nd4 is a refractive index to the d-line of any of the lens elements constituting the fourth lens unit, and
   $vd_4$ is an Abbe number to the d-line of any of the lens elements constituting the fourth lens unit.

7. The zoom lens system as claimed in claim 6, wherein the first lens unit comprises a lens element having a reflecting surface, and two lens elements each having optical power.

8. The zoom lens system as claimed in claim 6, wherein the following conditions (5) and (a) are satisfied:

$$2.0 < f_W/t_{G2} < 7.0 \tag{5}$$

$$f_T/f_W > 2.5 \tag{a}$$

where,
$t_{G2}$ is a thickness of the second lens unit (a distance on the optical axis from an object side surface of a most object side lens element to an image side surface of a most image side lens element),
$f_T$ is a focal length of the entire system at a telephoto limit, and
$f_W$ is a focal length of the entire system at a wide-angle limit.

9. An imaging device capable of outputting an optical image of an object as an electric image signal, comprising:
a zoom lens system that forms an optical image of the object; and
an image sensor that converts the optical image formed by the zoom lens system into the electric image signal, wherein
the zoom lens system is a zoom lens system as claimed in claim 6.

10. A camera for converting an optical image of an object into an electric image signal and then performing at least one of displaying and storing of the converted image signal, comprising:
an imaging device including a zoom lens system that forms the optical image of the object and an image sensor that converts the optical image formed by the zoom lens system into the electric image signal, wherein
the zoom lens system is a zoom lens system as claimed in claim 6.

11. A zoom lens system, in order from an object side to an image side, comprising a first lens unit having positive optical power, a second lens unit having negative optical power, a third lens unit having positive optical power, a fourth lens unit having optical power, and a fifth lens unit having optical power, wherein
any one of the first lens unit, the second lens unit, the third lens unit, the fourth lens unit, and the fifth lens unit includes a lens element having a reflecting surface that bends a light beam incident from an object, wherein
in zooming from a wide-angle limit to a telephoto limit at the time of image taking, the first lens unit, the third lens unit, and the fifth lens unit do not move along an optical axis, wherein
an aperture diaphragm is arranged between the third lens unit and the fourth lens unit, and wherein
at least two of all the lens elements constituting the lens system satisfy the following conditions (3-1) and (4-1), simultaneously:

$$vd < 59 \tag{3-1}$$

$$\left.\begin{array}{l} \text{when } vd < 34 \\ 0.000 < PgF + 0.0038 \times vd - 0.725 \\ \text{when } 34 \leq vd < 59 \\ 0.000 < PgF + 0.0020 \times vd - 0.664 \end{array}\right\} \tag{4-1}$$

where,
vd is an Abbe number to the d-line of any of the lens elements constituting the lens system, PgF is a partial dispersion ratio of any of the lens elements constituting the lens system, which is represented by the following equation:

$$PgF=(ng-nF)/(nF-nC),$$

ng is a refractive index to the g-line,
nF is a refractive index to the F-line, and
nC is a refractive index to the C-line.

12. The zoom lens system as claimed in claim 11, wherein the first lens unit comprises a lens element having a reflecting surface, and two lens elements each having optical power.

13. The zoom lens system as claimed in claim 11, wherein the following conditions (5) and (a) are satisfied:

$$2.0 < f_W/t_{G2} < 7.0 \tag{5}$$

$$f_T/f_W > 2.5 \tag{a}$$

where,
$t_{G2}$ is a thickness of the second lens unit (a distance on the optical axis from an object side surface of a most object side lens element to an image side surface of a most image side lens element),
$f_T$ is a focal length of the entire system at a telephoto limit, and
$f_W$ is a focal length of the entire system at a wide-angle limit.

14. An imaging device capable of outputting an optical image of an object as an electric image signal, comprising:
a zoom lens system that forms an optical image of the object; and
an image sensor that converts the optical image formed by the zoom lens system into the electric image signal, wherein
the zoom lens system is a zoom lens system as claimed in claim 11.

15. A camera for converting an optical image of an object into an electric image signal and then performing at least one of displaying and storing of the converted image signal, comprising:
an imaging device including a zoom lens system that forms the optical image of the object and an image sensor that converts the optical image formed by the zoom lens system into the electric image signal, wherein
the zoom lens system is a zoom lens system as claimed in claim 11.

16. A zoom lens system, in order from an object side to an image side, comprising a first lens unit having positive optical power, a second lens unit having negative optical power, a third lens unit having positive optical power, a fourth lens unit having optical power, and a fifth lens unit having optical power, wherein
any one of the first lens unit, the second lens unit, the third lens unit, the fourth lens unit, and the fifth lens unit includes a lens element having a reflecting surface that bends a light beam incident from an object, wherein
in zooming from a wide-angle limit to a telephoto limit at the time of image taking, the first lens unit, the third lens unit, and the fifth lens unit do not move along an optical axis, wherein
an aperture diaphragm is arranged between the third lens unit and the fourth lens unit, and wherein
at least one of all the lens elements constituting the third lens unit satisfies the following conditions (3-2) and (4-2), simultaneously:

$$vd_3 < 59 \tag{3-2}$$

$$\left.\begin{array}{l}\text{when } vd_3 < 34 \\ 0.000 < PgF_3 + 0.0038 \times vd_3 - 0.725 \\ \text{when } 34 \le vd_3 < 59 \\ 0.000 < PgF_3 + 0.0020 \times vd_3 - 0.664\end{array}\right\} \tag{4-2}$$

where, $vd_3$ is an Abbe number to the d-line of any of the lens elements constituting the third lens unit, PgF3 is a partial dispersion ratio of any of the lens elements constituting the third lens unit, which is represented by the following equation:

$$PgF_3 = (ng-nF)/(nF-nC),$$

ng is a refractive index to the g-line,
nF is a refractive index to the F-line, and
nC is a refractive index to the C-line.

17. The zoom lens system as claimed in claim 16, wherein the first lens unit comprises a lens element having a reflecting surface, and two lens elements each having optical power.

18. The zoom lens system as claimed in claim 16, wherein the following conditions (5) and (a) are satisfied:

$$2.0 < f_W/t_{G2} < 7.0 \tag{5}$$

$$f_T/f_W > 2.5 \tag{a}$$

where, $t_{G2}$ is a thickness of the second lens unit (a distance on the optical axis from an object side surface of a most object side lens element to an image side surface of a most image side lens element), $f_T$ is a focal length of the entire system at a telephoto limit, and $f_W$ is a focal length of the entire system at a wide-angle limit.

19. An imaging device capable of outputting an optical image of an object as an electric image signal, comprising:

a zoom lens system that forms an optical image of the object; and an image sensor that converts the optical image formed by the zoom lens system into the electric image signal, wherein the zoom lens system is a zoom lens system as claimed in claim 16.

20. A camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system is a zoom lens system as claimed in claim 16.

* * * * *